(12) United States Patent
Appel et al.

(10) Patent No.: US 11,882,629 B2
(45) Date of Patent: Jan. 23, 2024

(54) SOLIDS-PACKED APPARATUS FOR PERFORMANCE OF ENDOTHERMIC REACTIONS WITH DIRECT ELECTRICAL HEATING

(71) Applicant: BASF SE, Ludwigshafen am Rhein (DE)

(72) Inventors: Hagen Appel, Ludwigshafen (DE); Jens Bernnat, Ludwigshafen (DE); Friedrich Glenk, Ludwigshafen (DE); Grigorios Kolios, Ludwigshafen (DE); Gerhard Olbert, Ludwigshafen (DE); Frederik Scheiff, Ludwigshafen (DE); Bernd Zoels, Ludwigshafen (DE); Matthias Kern, Ludwigshafen (DE); Dieter Flick, Ludwigshafen (DE); Christopher Alec Anderlohr, Ludwigshafen (DE); Dirk Klingler, Lampertheim (DE); Achim Wechsung, Ludwigshafen (DE)

(73) Assignee: BASF SE, Ludwigshafen am Rhein (DE)

( * ) Notice: Subject to any disclaimer, the term of this patent is extended or adjusted under 35 U.S.C. 154(b) by 849 days.

(21) Appl. No.: 16/964,472

(22) PCT Filed: Jan. 22, 2019

(86) PCT No.: PCT/EP2019/051466
§ 371 (c)(1),
(2) Date: Jul. 23, 2020

(87) PCT Pub. No.: WO2019/145279
PCT Pub. Date: Aug. 1, 2019

(65) Prior Publication Data
US 2021/0051770 A1  Feb. 18, 2021

(30) Foreign Application Priority Data

Jan. 26, 2018  (EP) .................... 18153697

(51) Int. Cl.
*B01J 8/24*        (2006.01)
*H05B 3/00*        (2006.01)
(Continued)

(52) U.S. Cl.
CPC .............. *H05B 3/0004* (2013.01); *B01J 8/24* (2013.01); *C01B 3/26* (2013.01); *C01B 3/30* (2013.01);
(Continued)

(58) Field of Classification Search
CPC ...... H05B 3/0004; H05B 3/60; H05B 3/0009; B01J 8/24; B01J 2208/00176; C01B 3/26; C01B 3/30
(Continued)

(56) References Cited

U.S. PATENT DOCUMENTS 2,799,640 A  7/1957 Pevere et al.
2,982,622 A  5/1961 Jahnig et al.
(Continued)

FOREIGN PATENT DOCUMENTS

AT  175243  6/1953
BE  498231  1/1951
(Continued)

OTHER PUBLICATIONS

Extended European Search Report dated Aug. 1, 2018 in Patent Application No. 18153697.0, 3 pages.
(Continued)

*Primary Examiner* — Huy Tram Nguyen
(74) *Attorney, Agent, or Firm* — Grüneberg and Myers PLLC

(57) ABSTRACT

The present invention relates to an electrically heatable packed pressure-bearing apparatus for conducting endother-
(Continued)

mic reactions having an upper (3), middle (1) and lower (3) apparatus section, where at least one pair of electrodes (4, 5) in a vertical arrangement is installed in the middle section (1) and all electrodes are disposed in an electrically conductive solid-state packing (26), the upper and lower apparatus sections have a specific conductivity of 105 S/m to 108 S/m, and the middle apparatus section is electrically insulated against the solid-state packing, wherein the upper and lower apparatus sections are electrically insulated from the middle apparatus section, the upper electrode is connected via the upper apparatus section and the lower electrodes via the lower apparatus section or the electrodes are each connected via one or more connecting elements (10, 16) that are in electrical contact with these sections and the ratio of the cross-sectional areas of the upper and lower electrode to the cross-sectional area of the respective current-conducting connecting element or, without use of a connecting element, the ratio of the cross-sectional area of the upper and lower electrode to the cross-sectional area of the respective current-conducting apparatus section is 0.1 to 10.

16 Claims, 24 Drawing Sheets

(51) Int. Cl.
*H05B 3/60* (2006.01)
*C01B 3/26* (2006.01)
*C01B 3/30* (2006.01)

(52) U.S. Cl.
CPC ....... *H05B 3/60* (2013.01); *B01J 2208/00176* (2013.01)

(58) Field of Classification Search
USPC ....................................................... 422/199
See application file for complete search history.

(56) References Cited

U.S. PATENT DOCUMENTS

| | | | |
|---|---|---|---|
| 3,157,468 | A | 11/1964 | Kennedy et al. |
| 3,259,565 | A | 7/1966 | Kimberlin, Jr. |
| 4,192,962 | A | 3/1980 | Nakao et al. |
| 4,372,377 | A | 2/1983 | Morris |
| 5,406,582 | A | 4/1995 | du Plessis |
| 5,903,591 | A | 5/1999 | Brassey |
| 5,946,342 | A * | 8/1999 | Koslow .................. C01B 32/39 373/120 |
| 5,974,076 | A | 10/1999 | Brassey |
| 6,331,283 | B1 | 12/2001 | Roy et al. |
| 7,288,503 | B2 | 10/2007 | Von Broembsen |
| 7,842,846 | B2 | 11/2010 | Hechler et al. |
| 2002/0007594 | A1 | 1/2002 | Muradov |

FOREIGN PATENT DOCUMENTS

| | | |
|---|---|---|
| CH | 278580 | 10/1951 |
| DE | 882 124 | 7/1953 |
| DE | 29 53 691 C2 | 1/1985 |
| DE | 102 36 019 A1 | 2/2004 |
| DE | 699 17 761 T2 | 8/2005 |
| WO | WO 2013/004398 A2 | 1/2013 |
| WO | WO 2013/017609 A1 | 2/2013 |

OTHER PUBLICATIONS

International Preliminary Report on Patentability dated Jul. 28, 2020 in PCT/EP2019/051466, 10 pages.
International Search Report dated Apr. 16, 2019 in PCT/EP2019/051466 filed on Jan. 22, 2019, 3 pages.

* cited by examiner

Section A-A

Unwinding of the circumferential view

Hexagonal cross section

Diamond-shaped cross section

Lenticular cross section a.

b.

a.

b.

a.

b.

SOLIDS-PACKED APPARATUS FOR PERFORMANCE OF ENDOTHERMIC REACTIONS WITH DIRECT ELECTRICAL HEATING

The present invention relates to a heatable packed apparatus for conducting endothermic reactions which is divisible into an upper, middle and lower apparatus section, wherein the upper and lower apparatus sections are electrically insulated from the middle apparatus section, having at least one pair of electrodes in a vertical arrangement which is connected via the pressure-bearing apparatus shell in the upper and lower apparatus sections, and having an electrically conductive solid-state packing electrically insulated from the side wall of the middle apparatus section.

Highly endothermic reactions are frequently at the start of the value creation chain in the chemical industry, for example in the cracking of mineral oil fractions, the reforming of natural gas or naphtha, the dehydrogenation of propane, the dehydroaromatization of methane to benzene, or the pyrolysis of hydrocarbons. Temperatures between 500° C. and 1700° C. are required to achieve yields of industrial and economic interest. The main reason for this lies in the thermodynamic limitation of the equilibrium conversion.

Endothermic high-temperature reactions present two major challenges to industrial implementation: firstly introduction of heat with high power density at the reaction temperature required and secondly integrated recycling of heat between the product streams and the reactant streams. Integrated recycling of heat can bridge the temperature difference between the storage temperature of the reactants/products and the required reaction temperature with minimal energy expenditure.

According to prior art, fluidized bed reactors are used for heat-integrated conduction of endothermic processes (Levenspiel, O. (1988), Chemical engineering's grand adventure. Chemical Engineering Science, 43(7), 1427-1435). Different concepts are employed for the supply of heat to the endothermic reaction.

US 2002/0007594 discloses a process for parallel preparation of hydrogen and carbonaceous products, in which natural gas is introduced into a reaction space and thermally decomposed in the presence of a carbon-rich solid. US 2002/0007594 discloses that the carbonaceous solid is heated in a reactor separate from the reaction space for the thermal breakdown. The heating is effected by means of the combustion gases that form in a combustion of hydrocarbons or hydrogen. Subsequently, the heated solid is introduced into the reaction space.

The disadvantage of the use of a solid as heat carrier is that the solid has to be heated above the temperature level of the reaction in a separate combustion chamber and circulated between the combustion chamber and the reaction chamber. The handling of the hot solid leads to extreme thermal and mechanical stress on the reactor and the control devices. Moreover, the flow rate of solid-state particles is coupled to the heat demand of the reaction and uniform distribution of the mass flows across the cross section is a necessary condition to achieve optimal heat integration. Consequently, the ratio between the gas stream and the solid stream can be adjusted only within a narrow range.

WO 2013/004398 discloses generating the thermal energy for the heat carriers outside the reaction space and using gaseous heat carriers that are inert with respect to the breakdown reaction and/or are a product of this reaction. A disadvantage is that the flow rate of solid-state particles is coupled to the demands of heat integration. Moreover, the product stream of the breakdown reaction passes through a region of declining temperature in which the reverse reaction can take place.

The prior art (e.g. U.S. Pat. No. 6,331,283) also discloses autothermal processes in which the heat required for the endothermic reaction is generated via an exothermic accompanying reaction in the same reaction space. The disadvantage of these autothermal processes is the contamination of the gaseous product by the smoke gases, for example, in the case of hydrocarbon pyrolysis, entrainment of C-containing components into the hydrogen-rich product stream. A further disadvantage is the losses in the product yield: in the case of hydrocarbon pyrolysis, substantial loss of the pyrolysis carbon.

In addition, the heat can be transferred from the exothermic to the endothermic reaction chamber indirectly, for example by recuperative means (e.g. EP 15 16 8206) or via heat pipes (e.g. U.S. Pat. No. 4,372,377). A disadvantage of this concept is the complex internals in the hot section of the reaction chamber that place high material-related and construction demands on the gasket and on the avoidance of thermal stresses. Moreover, these internals disrupt the flow of solids. A further problem with this concept is the fouling of the heat transfer surfaces: for example, in the case of hydrocarbon pyrolysis, the deposition of pyrolytic carbon preferentially on hot surfaces.

U.S. Pat. No. 2,982,622 describes a heat-integrated pyrolysis of hydrocarbons in a moving bed composed of inert materials. The temperatures of 1200° C. that are required for the pyrolysis are attained with the aid of electrical heating. In the two figures of U.S. Pat. No. 2,982,622, the electrodes are in a horizontal arrangement. The possibility of a vertical arrangement is disclosed in the description. It can be inferred from the figures of U.S. Pat. No. 2,982,622 that the electrode bushings are in the hot region of the reactor. This results in multiple disadvantages: firstly, the electrode bushings form a heat bridge that can cause substantial heat losses and, secondly, the bushing is mechanically demanding per se since it has to be guided through layers with different thermal expansion, i.e. reactor wall made of steel and thermally insulating layers made of mineral materials. As a result, the bushing can experience high bending moments. Moreover, the electrode bushings must have high thermal stability and it is therefore necessary to accept a certain electrical resistance of the material; typically, graphite is used.

U.S. Pat. No. 2,799,640 describes acetylene preparation in a fluidized bed reactor, wherein the energy required is supplied electrically. The electrodes may be in a horizontal or vertical arrangement. For the vertical arrangement, a ring-shaped spider's web-like electrode grid is disclosed. It is stated that the vertical arrangement assures good distribution of the electrical current across the entire reactor space. It can be inferred from the figures of U.S. Pat. No. 2,799,640 that the electrode bushings are in the hot region of the reactor both in the case of a horizontal arrangement and in the case of a vertical arrangement of the electrodes.

AT 175243 describes an electrical furnace having two electrodes in a vertical arrangement for transfer of the current to the bulk material present in the oven shaft, wherein the upper electrode is designed as an internally cooled horizontal beam-shaped hollow body and is disposed within the bulk material packing. In this disclosure too, the electrode bushing is in the hot region of the reactor and leads through the brick-lined reactor lid.

CH 278580 discloses a shaft furnace having two annular electrodes in a vertical arrangement for transfer of the current to the bulk material present in the shaft furnace, wherein the upper electrode is disposed within the bulk material packing, while the lower electrode is disposed directly above the gas inlet stub. In this disclosure too, the electrode bushing is in the hot region of the reactor and leads through the side wall of the brick-lined reactor.

U.S. Pat. No. 3,259,565 discloses an electrically heated fluidized bed reactor for the pyrolysis of hydrocarbons. The document does not disclose any details about the geometric arrangement and construction of the electrodes. FIG. 2 of U.S. Pat. No. 3,259,565 indicates the bushing of the electrical supply lines through the side wall of the reactor. Thus, this solution is afflicted with the disadvantages mentioned further up.

A substantial advantage of a horizontal arrangement of the electrodes is that the electrodes do not block the cross section of the reactor. Moreover, in the case of a horizontal arrangement, vertically divided electrodes can distribute the electrical current and hence the heating output in a controlled manner in flow direction.

Advantages of a vertical arrangement include the distribution of the stream across a large cross-sectional area of the reactor, and also the parallel alignment of the electrical potential lines in flow direction and the option of a constant flow rate over the entire height of the reactor.

U.S. Pat. Nos. 5,903,591, 5,406,582 and 5,974,076 describe an apparatus and a process for the activation or regeneration of carbon in a tubular reactor operated at ambient pressure, consisting of two or more zones arranged one on top of another. The carbon is introduced at the upper end into the uppermost zone via a filling funnel connected to the reactor and then guided into the next zones in each case via funnel-shaped distributors. The reactor is electrically heated, with guiding of the electrical current into the uppermost zone via the filling funnel and into the middle zones via the funnel-shaped distributors. No details of the connections of filling funnel, connecting element and electrode are described. U.S. Pat. No. 5,903,591 accordingly discloses both electrode bushings in the hot region of the reactor and a two-dimensional end via the outer filling funnel in the cold region. A disadvantage of this invention is that the electrical current is distributed to the bed of carbon not just by the electrode but also via the wall of the filling funnel. A further disadvantage is that the connection of the electrode to the current-guiding housing produces additional passage resistances that lead to unwanted dissipation of electrical energy to thermal energy. Furthermore, the material transitions at the connecting elements constitute weak points for the mechanical stability of the electrodes. Finally, the cross-sectional blocking of the graphite electrodes in block form results in an unequal division of the stream of solids across the reactor cross section.

U.S. Pat. No. 5,946,342 describes the preparation and activation of activated carbon in an electrically heated moving bed. FIG. 3 of U.S. Pat. No. 5,946,342 shows electrodes in an annular configuration with high cross-sectional blocking of >50%. The electrodes consist of carbon and have ends that run to a point parallel to the flow direction of the activated carbon. The specific manner of contact connection of the electrodes is not described; it becomes clear from FIG. 3 of U.S. Pat. No. 5,946,342 that the contact connection is not via the reactor hoods.

U.S. Pat. No. 7,288,503 likewise describes the preparation and activation of activated carbon in an electrically heated fixed bed. Rod electrodes are used; the bushing of the electrodes is through the lid and the electrodes are insulated from the lid (see FIG. 3 of U.S. Pat. No. 7,288,503).

DE 102 36 019 A1 describes a reactor for performance of endothermic reactions which is equipped with one or more heating blocks that completely fill the reactor cross section and are electrically insulated from the reactor inner wall and optionally from one another, wherein the heating blocks are formed from open-cell foam. The manner of contact connection of the electrodes is not described.

In spite of many advantages of electrical heating:
  (i) Heating output is substantially constant over the entire temperature range and not limited by the temperature of a heat carrier.
  (ii) Dispensing with fuels and heat carriers simplifies the construction of the reactor and dispenses with the control circuits for metering of the corresponding streams of matter in the periphery of the reaction zone. Moreover, contamination/dilution of the process streams by foreign substances is ruled out. This increases the operational reliability of the reactor.
  (iii) The heating output can be introduced in a simple reactor without internals, i.e. with an unstructured cross section. This assures reliable scaling.
  (iv) The heating is locally emission-free. When renewable, CO2-free sources are used, heating is even entirely emission-free, the decisive and crucial disadvantage in the question of heating has to date been that electrical energy is costly compared to fossil energy carriers. However, this disadvantage should be eliminated in the next few years owing to the energy revolution.

Moreover, there has to date been a lack of a reactor concept for efficient introduction and for uniform distribution of the electrical energy in packed reactors for performance of endothermic gas phase or gas-solid reactions at high temperatures. The approaches of electrode contact connection via the reactor shell that have been indicated in the cited prior art are found to be impracticable in implementation. Firstly, the bushing of electrical connections in the hot region of the reactor is extremely complex and prone to failure. Secondly, the contact connection of the electrodes to the power source is effectively a point connection. This feature has multiple disadvantages: the electrical current is distributed nonuniformly over the cross section of the packing. Moreover, the connecting elements that accomplish the electrical contact connection of the electrodes have a small cross-sectional area, and hence high electrical resistance. As a result, a significant portion of the electrical power introduced is dissipated in the connecting elements and in the electrode itself, especially when it consists of graphite. Consequently, the electrical energy is utilized inadequately in the reactor packing. In addition, the connecting elements and/or the electrode have to be specifically cooled, which necessitates a costly and complicated apparatus construction. Thirdly, the construction of the electrodes and the accompanying connecting elements is not scalable: consequently, the operating conditions in a test reactor having a small cross-sectional area are not representative of an industrial apparatus having a large cross-sectional area.

In industry, at present, electrical heating is used only in a few large-scale processes: for example in the chemical gas phase reaction of ammonia and hydrocarbons to give hydrogen cyanide at temperatures of 1300 to 1600° C. in a fluidized bed reactor composed of electrically conductive carbon particles or in calcium carbide preparation in melt reduction furnaces at temperatures between 2000° C. and 2300° C. FIG. 2 of U.S. Pat. No. 3,157,468 shows a hydrogen cyanide reactor with electrodes in rod form in a vertical arrangement, having one electrode bushing per electrode. In Ullmann, "Calcium Carbide" chapter, prebaked carbon electrodes or self-baking Söderberg electrodes are mentioned. The type customary in the prior art is Söderberg-type hollow electrodes. The electrodes are operated with three-phase alternating current and contact-connected by cooled clamps on their periphery. Since carbon is a reactant in calcium carbide preparation, the electrodes are consumed and have to be replaced. The disadvantages of these designs are the complex bushing of the individual electrodes through the reactor housing since every bushing has to be separately sealed and electrically contact-connected and has to enable controlled axial movement of the electrode. Moreover, the number of bushings required grows in proportion to the cross-sectional area of the reactor.

In industrial reactors, temperature differences greater than 500 K can arise between the central axis and the reactor shell. Under the given operating conditions, the disclosed configurations of the electrode grids, which have a one-piece design and are mounted rigidly at the circumference, can break.

There is currently no commercially operated, electrically heated, packed reactor for the performance of endothermic reactions in the gas phase or of gas-solid reactions.

Most conventionally operated high-temperature processes are heated by fired furnaces. These processes are reliant on energy export in order to work economically; only about 50% of the heat generated in the process is actually utilized for the endothermic reaction. Complete thermal integration is thus still a far-off aim.

It was accordingly an object of the present invention to demonstrate an adaptable, scalable, electrically heated apparatus concept, especially pressure-bearing reactor concept, for the class of packed endothermic high-temperature processes. A further object was that of introducing the electrical energy with low loss into the heated zone of the apparatus, especially of the reactor. This means that advantageously more than 99% of the electrical power introduced into the apparatus is to be released in the heated zone. It was a further object that the current flows with maximum uniformity through the complete length of the heated zone; this can achieve virtually uniform heating of the packing and consequently a linear conversion profile. It was a further object to demonstrate a packed apparatus, especially a packed reactor, having maximum thermal integration. It was a further object for the trials in a test reactor with small cross-sectional area to be representative of an industrial apparatus, especially an industrial reactor. Moreover, the electrically heated apparatus, especially the electrically heatable reactor, was to be of simple configuration in general apparatus terms.

It has surprisingly been possible to demonstrate an electrically heatable, packed, pressure-bearing apparatus, especially a reactor, having an upper (3), middle (1) and lower (3) apparatus section, where at least one pair of electrodes (4, 5) in a vertical arrangement is installed/disposed in the middle section (1) and all electrodes are disposed/embedded in an electrically conductive solid-state packing (26), the upper and lower apparatus sections have a specific conductivity of $10^5$ S/m to $10^8$ S/m, and the middle apparatus section is electrically insulated against the solid-state packing, wherein the upper and lower apparatus sections are electrically insulated from the middle apparatus section, the upper electrode is connected via the upper apparatus section and the lower electrode via the lower apparatus section or the electrodes are each connected via one or more connecting elements (10, 16) that are in electrical contact with these sections and the ratio of the cross-sectional area of the upper and/or, preferably and, lower electrode to the cross-sectional area of the respective current-conducting connecting element or, without use of a connecting element, the ratio of the cross-sectional area of the upper and/or, preferably and, lower electrode to the cross-sectional area of the respective current-conducting apparatus section is 0.1 to 10.

The apparatus of the invention is also referred to hereinafter as "reactor".

"Pressure-bearing apparatus" in the present application is understood to mean an apparatus that withstands a pressure differential of greater than 0.5 bar between its interior and its environment.

"Hood" in the present application is understood to mean the end section of the pressure-bearing reactor shell.

"Connecting element" in the present application is understood to mean the components of the apparatus that are in electrically conductive connection to the hood and conduct the electrical current from the connection points on the hood to the electrodes. One example of a connecting element is a skirt secured to the reactor hood (see FIG. 1a).

The connecting elements are advantageously disposed on the outer circumference of the solid-state packing. The area of the clear cross section of the connecting element, i.e. the area enclosed by the connecting element, is advantageously greater than 90%, preferably greater than 95%, especially greater than 98%, of the cross-sectional area of the solid-state packing. More preferably, the connecting elements in circumferential direction conclude flush with the boundary of the solid-state packing. Advantageously, the connecting elements are cylindrical or prismatic. Advantageously, the connecting elements cover, in the horizontal direction, less than 10%, preferably less than 5%, especially less than 2%, of the cross-sectional area of the solid-state packing; more preferably, the connecting elements do not project horizontally into the solid-state packing. The connecting elements advantageously consist of the same material as the electrodes.

"Connecting element cross section" in the present application is understood to mean the area of intersection between the connecting element and any horizontal plane having the smallest area component that intersects with the connecting element (see FIG. 1b).

"Cross section of the electrode" in the present application is understood to mean the area of intersection between the electrode and the current-conducting connecting element contact-connected to the electrode (see FIG. 1c).

"Cross section of the upper or lower apparatus section" in the present application is understood to mean the area of intersection between the upper or lower apparatus section and any horizontal plane having the smallest area component that intersects with these sections (analogously to the connecting element in FIG. 1b).

"Electrically insulated" in the present application is understood to mean an ohmic resistance of greater than 1 kΩ, preferably greater than 100 kΩ, especially greater than 1 MΩ, between the solid-state packing and the side wall of the middle section of the reactor and between the upper and lower apparatus sections, e.g. hoods, and the side wall of the middle section of the reactor, measured according to standard DIN VDE 0100-600:2017-06 (release date 2017-06).

"Side wall of the reactor" in the present application is understood to mean the essentially vertically aligned section of the reactor shell (1). Along the side wall, horizontal sections through the reactor have essentially the same area component (cross-sectional area of the solid-state packing).

The ratio of the cross-sectional area of the upper and/or lower electrode, preferably of the upper and lower electrode, to the cross-sectional area of the respective current-conducting connecting element is advantageously 0.1 to 10, preferably 0.3 to 3, especially 0.5 to 2. Advantageously, the cross-sectional area of the electrode (e.g. the cross-sectional area of all electrode bars of an electrode in grid form) is in the range from 0.1 cm$^2$ to 10 000 cm$^2$, preferably 1 cm$^2$ to 5000 cm$^2$, especially 10 cm$^2$ to 1000 cm$^2$. Advantageously, the cross-sectional area of the current-conducting connecting element(s) is in the range from 0.1 cm$^2$ to 10 000 cm$^2$, preferably 1 cm$^2$ to 5000 cm$^2$, especially 10 cm$^2$ to 1000 cm$^2$. The calculation of the ratio (cross-sectional area$_{electrode(upper)}$/cross-sectional area$_{connecting\ element(upper)}$) and (cross-sectional area$_{electrode(lower)}$/cross-sectional area$_{connecting\ element\ (lower)}$) is illustrated in FIGS. 22 and 23 respectively.

Without use of a connecting element (between the electrode and the upper or lower connecting section) the ratio of the cross-sectional area of the upper and/or lower electrode, preferably of the upper and lower electrode, to the cross-sectional area of the respective current-conducting apparatus section is advantageously 0.1 to 10, preferably 0.3 to 3, especially 0.5 to 2. Advantageously, the cross-sectional area of the electrode is in the range from 0.1 cm$^2$ to 10 000 cm$^2$, preferably 1 cm$^2$ to 5000 cm$^2$, especially 10 cm$^2$ to 1000 cm$^2$. Advantageously, the cross-sectional area of the upper and/or lower apparatus section is in the range from 0.1 cm$^2$ to 10 000 cm$^2$, preferably 1 cm$^2$ to 5000 cm$^2$, especially 10 cm$^2$ to 1000 cm$^2$.

Advantageously, a potential difference (voltage) of 1 volt to 10 000 volts, preferably of 10 volts to 5000 volts, more preferably of 50 volts to 1000 volts, is applied between the upper apparatus section and the lower apparatus section, for example two reactor hoods. The electrical field strength between the hoods is advantageously between 1 V/m and 100 000 V/m, preferably between 10 V/m and 10 000 V/m, further preferably between 50 V/m and 5000 V/m, especially between 100 V/m and 1000 V/m.

The specific electrical conductivity of the solid-state packing is advantageously from 0.001 S/cm to 100 S/cm, preferably from 0.01 S/cm to 10 S/cm, especially from 0.05 S/cm to 5 S/cm.

This advantageously results in an electrical current density in the solid-state packing of 0.01 A/cm$^2$ to 100 A/cm$^2$, preferably from 0.05 A/cm$^2$ to 50 A/cm$^2$, especially from 0.1 A/cm$^2$ to 10 A/cm$^2$.

The reactor is advantageously divided into multiple zones. Advantageously, the following are arranged from the bottom upward: the outlet for the particles, the gas inlet (12), the lower heat transfer zone, the lower electrode (5), the heated zone, the upper electrode (4) optionally with a side draw (19), the upper heat transfer zone, the exit for the gaseous product stream (7) and the feed for the particle stream (6).

The lower heat transfer zone is the vertical zone between the upper edge of the gas inlet and the upper edge of the lower electrode.

The upper heat transfer zone is the vertical zone between the lower end of the upper electrode and the upper end of the solid-state packing.

The heated zone at any point in the reactor cross section is defined as the vertical distance between the lower end of the upper electrode and the upper end of the lower electrode.

Advantageously, the bottom side of the upper electrode and the top side of the lower electrode are horizontal over the entire reactor cross section. Consequently, the length of the heated zone, especially the zone between the electrodes, is advantageously uniform over the entire reactor cross section. The heated reactor cross section is advantageously from 0.005 m$^2$ to 200 m$^2$, preferably from 0.05 m$^2$ to 100 m$^2$, more preferably from 0.2 m$^2$ to 50 m$^2$, especially from 1 m$^2$ to 20 m$^2$. The length of the heated zone is advantageously between 0.1 m and 100 m, preferably between 0.2 m and 50 m, more preferably between 0.5 m and 20 m, especially between 1 m and 10 m. The ratio of the length to the equivalent diameter of the heated zone is advantageously from 0.01 to 100, preferably from 0.05 to 20, more preferably from 0.1 to 10, most preferably from 0.2 to 5.

The electrodes are advantageously positioned within the solid-state packing (see FIGS. 1 and 2). The vertical distance between the upper edge of the solid-state packing (the lowest point in the case of a bank) and the lower edge of the electrode plates or, without the use of electrode plates, the lower edge of the electrode bars in the upper electrode is advantageously from 10 mm to 5000 mm, preferably from 100 mm to 3000 mm, further preferably from 200 mm to 2000 mm. This section is advantageously from 1% to 50%, preferably from 2% to 20%, more preferably from 5% to 30%, of the total height of the solid-state packing.

The vertical distance between the upper edge of the electrode plates in the lower electrode and the feed for the gaseous reactants is advantageously from 10 mm to 5000 mm, preferably from 100 mm to 3000 mm, further preferably from 200 mm to 2000 mm. This section is advantageously from 1% to 50%, preferably from 2% to 20%, more preferably from 5% to 30%, of the total height of the solid-state packing.

The vertical distance between the feed for the particle stream (6) and the upper edge of the solid-state packing is advantageously 50 mm to 5000 mm, preferably between 100 mm and 3000 mm, more preferably between 20 mm and 2000 mm.

The electrodes may take on all forms known to those skilled in the art. By way of example, the electrodes take the form of a grid (FIG. 12, FIG. 13, FIG. 14) or of rods (FIG. 16).

When rods are used, electrode rods that run to a point are particularly advantageous. Preferably, the upper and lower electrode rods run to a point on the side toward the heated zone. The tip may be conical (FIG. 16a) or wedge-shaped (FIG. 16b). Correspondingly, the end of the rod may take the form of a dot or a line. FIG. 17 shows a diagram of the reactor of the invention equipped with rod electrodes. FIG. 18 shows a detailed diagram of the upper reactor hood. By contrast with U.S. Pat. No. 3,157,468 or U.S. Pat. No. 7,288,503, for example, the rod electrodes are connected to the hood in an electrically conductive manner and are jointly supplied with electrical power via the hood.

Preferably, the electrodes take the form of a grid. For grid form, various configuration variants are conceivable, for example grids in honeycomb form composed of advantageously regular polygons (FIG. 12a), rectangular grids (FIG. 12b) formed from parallel bars, grids in the form of spokes (FIG. 13) or grids composed of concentric rings (FIG. 14). Particular preference is given to grids in the form of spokes and grids composed of concentric rings.

Particular preference is given to an electrode in grid form which is borne in a fixed manner on the inside of the upper or lower apparatus section, for example of a hood, or on a connecting element, for example a skirt secured to the apparatus section.

A fixed bearing is understood to mean the connection of a rigid body to its environment, with the aid of which relative movement between the body and its environment is prevented in any direction.

For example, the grid in the form of spokes is advantageously formed from bars arranged in a star shape that are suspended on the hood or a connecting element secured thereon (FIG. 13a). As well as the term "bars", the prior art also uses the terms "spoke", "carrier" or "rail".

In a further configuration, the grid in the form of spokes is advantageously formed from bars arranged in a star shape that are suspended on the hood and bear electrode plates that proceed orthogonally therefrom (FIG. 13b). As well as the term "electrode plate", the prior art also uses the terms "wing", "fin", "side rail" or "side bar".

In a further configuration, the grid is advantageously formed from concentric rings that are connected via radial bars (FIG. 14a, 14b). According to the definition in DE 69917761 T2 [0004], the grid shape is "fractally scaled".

The electrodes, i.e. electrode bars and electrode plates, divide the cross section of the reaction zone into grid cells. The reaction zone is the volume within the reactor which is filled with the solid-state packing. Grid cells are closed or convex area segments of the reactor cross section that are bounded by the electrode grid. By way of example, FIG. 12a shows the closed area elements; these arise as a result of the honeycomb-shaped grid (46) within the hood (10) or (16). For example, in FIG. 12b, the cells are the strips between two adjacent bars (46) and the corresponding arc sections of the hood. In FIGS. 12 to 14, those areas are individual grid cells that are bounded by continuous or dotted lines. By way of example, in FIG. 13a, the cells are bounded by adjacent spokes of the grid (4, 5) and optionally by the dotted circular lines or by the hood (10, 16). By way of example, in FIG. 13b, the cells are bounded by the adjacent electrode plates of a bar, the corresponding bar segment and the dotted center line between two adjacent grids. By way of example, the cells in FIG. 14a and FIG. 14b are the closed area elements that are bounded by adjacent bars and rings, or by the reactor hood.

The grid cells are characterized by the following parameters: open cross section, equivalent diameter, out-of-roundness and cross-sectional blocking.

The term "open cross section" in the present invention is understood to mean the area of the cross section of a cell through which a flow can pass. The term "equivalent diameter" in the present invention is understood to mean the diameter of a circle of equal area to the grid cell. The term "out-of-roundness" in the present invention is understood to mean the minimum width of a ring between two cycles having a common center that fully surrounds the edge line of the grid cell. Out-of-roundness has the dimension of a length. The out-of-roundness of a circle is zero. The term "cross-sectional blocking" in the present invention is understood to mean the proportion of the cross section of the solid-state packing which is covered by the electrode, based on the total cross-sectional area of the solid-state packing (the reaction zone).

The open cross section of the grid cells is advantageously between 4 cm$^2$ and 10 000 cm$^2$, preferably between 20 cm$^2$ and 3000 cm$^2$, more preferably between 100 cm$^2$ and 1000 cm$^2$. The open cross section is accordingly independent of the reactor diameter and the number of grid cells is virtually proportional to the reactor cross section.

The equivalent diameter of the grid cells is advantageously between 10 mm and 2000 mm, preferably between 20 mm and 1000 mm, more preferably between 50 mm and 500 mm.

The out-of-roundness of the grid cells is advantageously between 1 cm and 10 m, preferably between 1 cm and 2 m, more preferably between 1 cm and 1 m, especially between 1 cm and 50 cm. Standardized out-of-roundness is defined as the quotient of the out-of-roundness and the equivalent diameter of the grid cell. Preferably, the standardized out-of-roundness is not less than 0 and less than 100, preferably not less than 0 and less than 10, especially not less than 0 and less than 5. By way of example, the diagrams in FIGS. 12a, 12b and 13a show the out-of-roundness of individual grid cells.

The cross-sectional blocking of the electrodes is advantageously between 1% and 50%, preferably between 1% and 40%, more preferably between 1% and 30%, especially between 1% and 20%.

The specific surface area of electrodes in grid form, i.e. the quotient between the circumference of the electrode (i.e. the length of the contact line between the electrode and the bed in a vertical project of the reactor) and the cross section of the bed, is advantageously 0.01 to 500 m$^2$/m$^3$, preferably 0.1 to 100 m$^2$/m$^3$, further preferably 1 to 50 m$^2$/m$^3$, especially 2 to 20 m$^2$/m$^3$.

The material of the electrodes, i.e. bars and electrode plates, is advantageously iron, cast iron or a steel alloy, copper or a copper-base alloy, nickel or a nickel-base alloy, a refractory metal or an alloy based on refractory metals and/or an electrically conductive ceramic. More particularly, the bars consist of a steel alloy, for example with materials number 1.0401, 1.4541, 1.4571, 1.4841, 1.4852, 1.4876 to DIN EN10027-2 (release date 2015-07), of nickel-base alloys, for example with materials number 2.4816, 2.4642, of Ti, especially alloys with materials number 3.7025, 3.7035, 3.7164, 3.7165, 3.7194, 3.7235. Among the refractory metals, Zr, Hf, V, Nb, Ta, Cr, Mo, W or alloys thereof are particularly advantageous; preferably Mo, W and/or Nb or alloys thereof, especially molybdenum and tungsten or alloys thereof. In addition, bars may comprise ceramics such as silicon carbide and/or carbon, e.g. graphite, where the ceramics may be monolithic or fiber-reinforced composite materials (e.g. ceramic matrix compounds, CMC, e.g. carbon fiber composites, CFC).

Advantageously, the material of the electrodes is chosen depending on the use temperature. Steel is advantageously chosen within a temperature range from −50 to 1250° C., preferably −50 to 1000° C., further preferably −50 to 750° C., especially −50 to 500° C. Molybdenum is advantageously chosen within a temperature range from −50 to 1800° C., preferably −50 to 1400° C., especially −50 to 1300° C. Carbon fiber-reinforced carbon is advantageously chosen within a temperature range from −50 to 2000° C., preferably −50 to 1600° C., especially −50 to 1300° C.

In a specific application, the electrodes may also consist of multiple materials. When multiple materials are used, the electrode is advantageously divided into sections of different materials over its height. The selection of material in the different zones is advantageously guided by the following criteria: thermal stability, electrical conductivity, cost. Advantageously, the segments made of different materials are force-fittingly or cohesively bonded to one another. Advantageously, the connections between the segments are smooth.

Electrodes may advantageously be executed as solid electrodes or as hollow electrodes. In the case of solid electrodes, advantageously, according to the design, the electrode rods, the electrode bars and/or the electrode plates are solid bodies. In the case of hollow electrodes, advantageously, according to the design, the electrode rods, the electrode bars and/or the electrode plates are hollow bodies. The cavities within the electrodes may advantageously form channels utilizable for introduction of gaseous streams into the reaction zone or for removal of gaseous streams from the reaction zone. The walls of the hollow electrodes are advantageously formed from slotted sheets, perforated sheets, expanded metal grids or mesh weaves.

Grid electrodes in the form of spokes according to FIG. 13a and FIG. 13b:

the grid in the form of spokes advantageously has electrode bars, advantageously 2 to 30 electrode bars, preferably 3 to 24 electrode bars, especially 4 to 18 electrode bars. On each of these electrode bars are advantageously secured 1 to 100 electrode plates, preferably 2 to 50, especially 4 to 20.

The length of the bars is advantageously between 1 cm and 1000 cm, preferably between 10 cm and 500 cm, especially between 30 cm and 300 cm. The height of the bars is advantageously between 1 cm and 200 cm, preferably between 5 cm and 100 cm, especially between 10 cm and 50 cm. The thickness of the bars (at the thickest point) is advantageously between 0.1 mm and 200 mm, preferably between 1 mm and 100 mm.

The side profile of the bars and of the electrode plates is advantageously rectangular, trapezoidal or triangular (FIG. 9, FIG. 10), although other geometric forms, for example rounded forms, are also conceivable. Advantageously, the lower edges of the bars and plates in the upper electrode and the upper edges of the bars and plates in the lower electrode are horizontal (FIG. 9, FIG. 10).

The cross section of the bars and the electrode plates is advantageously lenticular, diamond-shaped or hexagonal (FIG. 11). In this case, the upper end and the lower end of the bars advantageously run to a point. The thickness of a bar or electrode plate at the upper end and at the lower end (at the tips) is advantageously between 0.001 mm and 10 mm, preferably between 0.001 mm and 5 mm, especially between 0.001 mm and 1 mm.

The profile of the bars and the electrode plates in top view is advantageously straight or in sawtooth form or wavy form. Wavy profiles are advantageously sinusoidal or rectangular (FIG. 7). In the case of profiles in sawtooth form and wavy form, the width of a tooth or wave is advantageously 1 cm to 200 cm, preferably 1 cm to 100 cm, further preferably 1 cm to 50 cm; the height of the tooth or wave is advantageously 1 mm to 200 mm, preferably 1 mm to 100 mm, further preferably 1 mm to 50 mm.

The optional electrode plates are bonded to the bars and, in the top view of the reactor, are advantageously oriented orthogonally to the bars. Advantageously, the electrode plates are bonded to the bar either in the middle or at one end of the electrode plates. Advantageously, the contact surface between electrode plate and bar constitutes the sole fixed bearing for the positioning of an electrode plate. Correspondingly, the two ends are free or one end is free, meaning that it has no fixed connection to other electrode plates or other bars. As a result, the electrode plates can deform in a stress-free manner by thermal expansion.

The distance between the adjacent electrode plates on a bar is advantageously 1 to 2000 mm, preferably 5 to 1000 mm, especially 10 to 500 mm.

In the case of curved/non-flat electrode plates, the length is understood to mean the circumferential length. The length of the electrode plates advantageously decreases in a linear manner over the radius from the outer electrode ring toward the middle of the reactor. Advantageously, the length of each plate on a bar is proportional to its distance from the center point of the reactor cross section; in this case, the length of the electrode plates is understood to mean the length of the outermost electrode plate. The length of the electrode plates is advantageously 1 cm to 1000 cm, preferably 2 cm to 500 cm, further preferably 5 cm to 200 cm, especially 10 cm to 100 cm. The height of the electrode plates is advantageously 1 cm to 200 cm, preferably 2 cm to 100 cm, further preferably 5 cm to 50 cm, especially 10 cm to 50 cm. The thickness of the individual electrode plates on a bar is constant. The thickness of the electrode plates (at the thickest point), grid thickness, is advantageously 0.1 mm to 100 mm, preferably 1 mm to 50 mm. The ratio of height to thickness of the electrode plates is advantageously 1 to 500, preferably 2 to 250, further preferably 5 to 100, especially 10 to 50.

In the case of the grids in the form of spokes, the electrode bars within the reactor advantageously run in a star-shaped manner. Advantageously, the individual electrode bars are not connected to one another. The electrode bars are advantageously connected at their outer end to the reactor hood or to a connecting element, for example a skirt, on the reactor hood. Advantageously, the other end of the electrode bars is free, meaning that it has no fixed connection to other electrode bars. Advantageously, the contact area between electrode bar and upper or lower apparatus section, for example the hood, or a connecting element, for example the skirt, is the sole fixed bearing, called a single fixed bearing, for the positioning of an electrode bar. Correspondingly, the other end of the electrode bar is free, such that the electrode bar can be deformed in a stress-free manner by thermal expansion.

The upper and lower edges of bars and electrode plates are advantageously offset from one another. The offset edges of the bars and plates avoid node points that could otherwise lead to stagnation of the bed. FIG. 15 shows, by way of example, preferred variants for the lower electrode. What is shown in each case is a grid segment assigned to a single bar. In the variant according to FIG. 15a, the upper edge of the electrode plates is arranged higher than the upper edge of the bar. In the variant according to FIG. 15b, the upper edge of the electrode plates is arranged lower than the upper edge of the bar. The offset between the upper edge of the electrode plates and the upper edge of the bars is advantageously −500 mm to 500 mm, preferably −200 mm to 200 mm, more preferably −100 mm to 100 mm. Negative values mean that the upper edge of the electrode plates is arranged lower than the upper edge of the bars. The offset between the lower edge of the electrode plates and the lower edge of the bars is advantageously −500 mm to 500 mm, preferably −200 mm to 200 mm, more preferably −100 mm to 100 mm. Negative values mean that the upper edge of the electrode plates is arranged lower than the upper edge of the bars.

Fractally scaled grid electrodes according to FIG. 14a and FIG. 14b:

The grid of concentric rings (fractally scaled electrode) advantageously has electrode bars that run virtually in a star shape, and electrode plates in the form of circular arc-shaped segments. The upper and lower edges of the bars and the electrode plates are advantageously offset from one another in terms of height. The bars are connected to the electrode plates on both sides, the electrode plates being continuous within a circle segment, for example ¼ circle in FIG. 14a and ⅙ circle in FIG. 14b. The number of bars increases from the inside out. The bars of the outer ring are secured to the reactor hood. The number and arrangement of the bars follows the following rule: the core of the grid has the diameter 2*s, does not have any bars and is counted as ring 1. The recurrence formula for the construction of further rings is: "The ring i has the outer diameter 2*i*s and has n*i bars distributed uniformly over the angle coordinates. In every even ring, the bars are rotated clockwise by π/(n*i) rad". s denotes the ring width. n is a natural number and is used as the basis of the recurrence. The ring width s is advantageously 1 to 2000 mm, preferably 5 to 1000 mm, especially 10 to 500 mm. n is advantageously a number between 2 and 30, preferably a number between 2 and 20, especially a number between 2 and 10. FIG. 14a depicts a grid with base 4 and FIG. 14b a grid with base 6. In general, lattice structures that are scalable in terms of their extent by a recurrence formula are referred to as fractally scaled structures.

In the fractally scaled grids, the electrode bars within the reactor advantageously run in a star shape. Advantageously, the circular arc-shaped adjacent electrode plates are not connected to one another in part or in segments. The grid is accordingly advantageously divided into segments, advantageously 2 to 30 segments, preferably 2 to 20 segments. The outer electrode bars are advantageously connected at their outer end to the reactor hood or to the connecting element, for example a skirt, on the reactor hood. Advantageously, the contact surface between the electrode bars and the upper or lower apparatus section, for example the hood or the connecting element, for example a skirt, constitutes the sole fixed bearing, called a single fixed bearing, for the positioning of a grid segment. Thus, the grid segment can be deformed in a stress-free manner, i.e. without contact with adjacent grid segments, by thermal expansion.

The upper and lower sections of the reactor housing advantageously each form the contacts for the upper and lower electrodes. The electrodes are advantageously contact-connected via the end sections of the reactor housing, also called reactor hoods (see FIG. 4 and FIG. 5). The reactor hoods advantageously have one or more electrical connections, (8) and (17), preferably one to three connections, on the outside.

Optionally, the reactor hoods accordingly have connecting elements, for example a skirt (10), (16) that projects into the middle reactor section; the term "skirt" is understood to mean a continuation of the hood on the inside of the sealing surface to the side wall (11), (18). Advantageously, the electrodes are connected at the skirt of the hood. The contact-connection between the reactor hood and the electrode can be executed by means of a cohesive bond, for example welding or soldering, by a force-fitting bond, for example screw connection or clamping, or by a form-fitting bond, for example via interdigitation, tongue and groove, or via pin and bolt. The preferred type of connection is determined by the material of the electrode bars. Metallic electrode bars are preferably welded or soldered to the hood. Nonmetallic electrode bars are preferably connected to the hood via a combined form-fitting and force-fitting or cohesive bond, for example a tongue and groove connection combined with a screw connection, with a rivet connection or with an adhesive bond.

In the case of the star-shaped and fractally scaled grids, the electrode bars are advantageously bonded at their outer end to the reactor hood or to the skirt of the reactor hood.

The contact area between the electrode and the upper or lower apparatus section, the reactor hood, or the connecting element contact-connected to the hood, for example a skirt, is advantageously between 0.1 cm$^2$ and 10 000 cm$^2$, preferably between 1 cm$^2$ and 5000 cm$^2$, especially between 10 cm$^2$ and 1000 cm$^2$. Using a connecting element, for example a skirt, the contact area between the reactor hood and the connecting element contact-connected to the hood is advantageously between 0.05 cm$^2$ and 200 000 cm$^2$, preferably between 0.5 cm$^2$ and 50 000 cm$^2$, especially between 50 cm$^2$ and 10 000 cm$^2$.

Advantageously, the temperature at the contact surface between the upper apparatus section and the connecting element is advantageously less than 600° C., preferably less than 450° C., more preferably less than 150° C., advantageously in the range of 0 to 600° C., preferably 10 to 450° C.

The ratio of the cross-sectional area of the connecting elements, for example of a skirt, to the cross-sectional area of the solid-state packing is advantageously 0.001 to 0.2 (0.1% to 20%), preferably 0.002 to 0.1 (0.2% to 10%), more preferably 0.5% to 5%. The ratio of the cross-sectional area of the current-guiding hood to the cross-sectional area of the solid-state packing is advantageously 0.001 to 0.2 (0.1% to 20%), preferably 0.002 to 0.1 (0.2% to 10%), more preferably 0.005 to 0.05 (0.5% to 5%).

In the hood-electrode unit, advantageously less than 5%, preferably less than 2%, more preferably less than 1%, especially less than 0.1%, of the total electrical energy introduced is dissipated. Preferably, the range of dissipated energy is 0% to 5%, preferably 0% to 2%, especially 0% to 1%. As a result, the electrical energy can be utilized virtually completely for the heating of the packing between the electrodes. "Dissipated energy" is understood to mean the electrical energy converted to heat energy by the ohmic resistance in the zone. The low energy dissipation is achieved as a result of the low ohmic resistance of the hood-electrode unit. The ohmic resistance between any two points in the hood-electrode unit is advantageously $10^{-12}\Omega$ to $10^{-3}\Omega$, preferably $10^{-12}\Omega$ to $10^{-5}\Omega$, especially $10^{-12}\Omega$ to $10^{-7}\Omega$. The ohmic resistance of the hood-electrode unit is achieved via the selection of material and dimensions of the hood-electrode unit. For the methane pyrolysis reaction system, specific dimensions are described in the example.

The pressure-bearing reactor shell advantageously consists of an upper reactor section (1), a middle reactor section (2) and a lower reactor section (3). Preferred materials for the reactor shell are steel alloys, for example with materials number 1.4541, 1.4571. The preferred specific conductivity of the upper and/or lower apparatus section is advantageously between $10^5$ S/m and $10^8$ S/m, preferably between $0.5 \times 10^6$ S/m and $0.5 \times 10^8$ S/m. The specific ohmic resistivity of the outer pressure-bearing reactor shell is advantageously between $10^{-8}$ S/m and $10^{-5}$ S/m, preferably between 2 $10^{-7}$ Ωm and 2 $10^{-6}$ Ωm.

For example, the upper section and lower section of the reactor comprise the concluding end of the reactor housing. The upper reactor section is advantageously configured as a hood. The lower reactor section is likewise advantageously configured as a hood, especially as a conical hood (hood with outflow cone for the solid granules).

The upper reactor section, advantageously the reactor hood, advantageously has the following connections (see FIG. 4): electrical supply (8), solids inlet (6) and optionally a distributor (9) (for example in the form of a cone distributor), one or more outlets for a product stream (7), advantageously for a gaseous product stream, feeds for sensors, for example for temperature measurement, fill level measurement, concentration measurement, pressure measurement.

The lower reactor section, advantageously the conical reactor hood, advantageously has the following connections (see FIG. 5): the exit cone for a product stream (14), advantageously for a solid product stream, the electrical supply for the lower electrode (17), at least one inlet for reactant streams (12), preferably for gaseous reactant streams, feeds for sensors, for example for temperature measurement, concentration measurement, pressure measurement.

The reactant stream is, or optionally multiple reactant streams are, advantageously introduced via a ring distributor (13) or multiple feeds distributed over the circumference in the lower reactor hood. By means of a plate distributor (12) connected thereto, the reactant stream can be distributed uniformly over the cross section in the feed plane. The optional plate distributor in top view advantageously has the same shape as the electrodes and is thus in the same vertical alignment as the electrodes. Alternatively, the distributor consists of single elements, each of which is advantageously installed below elements of the electrode.

The middle reactor section is advantageously cylindrical or prismatic (see FIG. 3). This region is advantageously lined with an electrically insulating lining (21) which is thermally stable up to about 2000° C., preferably up to about 1700° C., preferably up to about 1400° C., preferably up to about 1200° C. This section defines the length of the heated zone. The length of the middle reactor section is advantageously between 0.25 m and 100 m, preferably between 0.5 m and 50 m, more preferably between 0.75 m and 20 m, especially between 1 m and 10 m.

The vertical distance between the upper edge of the middle reactor section and the upper edge of the solid-state packing is advantageously −2000 mm to 2000 mm, preferably −1000 mm to 1000 mm, more preferably −500 mm to 500 mm. Negative values mean that the upper edge of the middle reactor section is arranged lower than the upper edge of the solid-state packing. The vertical distance between the upper edge of the middle reactor section and the lower edge of the electrode plates on the upper electrode is advantageously from 10 mm to 5000 mm, preferably from 100 mm to 3000 mm, further preferably from 200 mm to 2000 mm. The vertical distance between the upper edge of the electrode plates on the lower electrode and the feed of the gaseous reactants is advantageously from 10 mm to 5000 mm, preferably from 100 mm to 3000 mm, further preferably from 200 mm to 2000 mm.

The electrical insulation assumes the functions of: (i) insulating the hoods from the side wall of the reactor, i.e. the middle section of the reactor shell, and (ii) insulating the bed from the side wall of the reactor.

Typically, refractory rocks advantageously comprising aluminum oxide, zirconium oxide and mixed oxides of aluminum, magnesium, chromium, silicon are used for the electrically insulating lining (see, for example, thesis by Patrick Gehre: Korrosions- und thermoschockbeständige Feuerfestmaterialien für Flugstromvergasungsanlagen auf Al2O3-Basis-Werkstoffentwicklung und Korrosionsuntersuchungen [Corrosion- and Thermal Shock-Resistant Refractory Materials for Entrained Flow Gasification Plants Based on Al2O3—Material Development and Corrosion Studies]. (TU Freiberg, 2013)).

The middle reactor section is advantageously electrically insulated with respect to the two hoods. For example, an intermediate ring of electrically insulating material (23) and (25) is used for this purpose in each case, which is advantageously clamped in a gas-tight manner between the middle reactor section and the upper reactor hood (11) or the lower reactor hood (18). The intermediate ring advantageously consists of enameled or plastic-covered metal, of plastic, for example PTFE or PEEK, or of gas-tight ceramic. Alternatively, sealing rings of electrically insulating material, for example mica, may be clamped directly between the flanges of the middle reactor section and the reactor hoods. The thickness of the intermediate ring is advantageously 2 mm to 500 mm, preferably 3 mm to 200 mm, more preferably 5 mm to 100 mm.

Advantageously, the upper and/or lower apparatus section, for example the upper hood, is in a twin-shell design (see FIG. 6). The outer shell of the hood (41) advantageously surrounds the above-described hood (3 or 31) that advantageously constitutes the inner shell. The inner shell is advantageously the current-conducting connecting element. The outer shell is advantageously electrically insulated from the inner shell. The outer shell is advantageously connected to the middle reactor section (1) via a flange (22 or 42). A gasket is advantageously inserted between the flanges (42) and (22). Advantageously, the gasket is a flat gasket, a lens gasket, an O-ring gasket or a weld lip gasket. In addition, the outer shell (41) advantageously comprises the bushings (43) for the connections (6), (7), (8) that lead into the inner shell of the hood. The bushings are advantageously detachable, such that the outer shell can be separately flanged onto the reactor or removed (see FIG. 19 and FIG. 20).

The advantageous configuration of the bushings through a two-shell hood is known to those skilled in the art, for example described in U.S. Pat. No. 7,842,846 B2. In the present invention, the bushing is advantageously additionally in an electrically insulating design between the inner and outer shells. FIG. 19 shows, by way of example, the bushing for entry of the stream of particles (6) into the reactor. The solid stream of particles is advantageously guided through the inlet tube (58) that has been provided with a flange (52). The inlet tube advantageously consists of a metallic material, preferably of a metallic tube, which has been encased with an electrically insulating layer, for example enamel. A bushing advantageously comprises two concentric cylindrical stubs, of which the outer stub (51) is secured to the outer shell and the inner stub (54) to the inner shell of the hood. Advantageously, the inner stub has a compensator that permits flexibility of the inner stub in longitudinal direction. Advantageously, the inner stub ends in a threaded plate, the outer circumference of which is less than the circumference of the outer stub. The outer stub advantageously ends in an apparatus flange. The inner flange and outer flange are advantageously clamped in a gas-tight manner against an intermediate ring (53). The inner stub and the outer stub are advantageously electrically insulated from one another. For this purpose, advantageously, the intermediate ring of metal is clamped by flat gaskets (55) of electrically insulating material, for example mica or plastic, between the flange of the inlet tube on one hand and the flange of the outer stub and the threaded plate of the inner stub on the other hand. Sleeves of electrically insulating material (57), for example plastic or oxide ceramic, are advantageously inserted between the securing screws and the intermediate ring.

Alternatively, the intermediate ring may consist of electrically insulating material, for example plastic, PEEK or densely sintered oxide ceramic. Alternatively, an intermediate ring of metal may have been coated with an electrically insulating material, for example enamel or plastic. Advantageously, the gasket of the intermediate ring against the outer stub is a flat gasket, a lens gasket, an O-ring gasket or a weld lip gasket.

FIG. 20 shows, by way of example, the bushing of the electrical supply wire that leads to the inner shell of the hood. The bushing comprises a pin (63) soldered or compressed onto the outside of the inner shell (2). The pin is connected via a screw connection or clamp connection to a bush (64) attached to the electrical supply. The bush bears a collar at the lower end. The pin is loosely inserted in a ceramic sleeve (65) of electrically insulating material. The sleeve advantageously consists of oxide ceramic. The sleeve preferably consists of metal and is encased with a layer of enamel. The ceramic sleeve is in turn inserted in a pipe stub (61). This pipe stub is welded onto the outer shell of the hood (27). The pipe stub advantageously comprises a compensator and a welding flange. The pipe stub (61), the insulation sleeve (65) and the bush (64) are clamped by means of a loose flange (62). Flat gaskets (66) have been inserted between the pipe stub (61) and the sleeve (65) and between the sleeve (65) and the bush (64). Advantageously, the flat gaskets consist of mica. Alternatively, the gaskets may be designed as O-ring gaskets. Sleeves of electrically insulating material (67), for example plastic or oxide ceramic, are advantageously inserted between the securing screws and the flange of the outer pipe stub.

Advantageously, the outer shell of the hood according to FIGS. 6 and 7 comprises connections for the entry (44) and exit (45) of an inert gas stream comprising nitrogen, argon, carbon dioxide and/or water vapor for example. The inert gas purges the shell space between the inner shell and the outer shell of the hood. Advantageously, the pressure in the shell space is set to a slightly higher level than the pressure in the immediately adjacent part of the reaction zone. The pressure differential between the shell space and the directly adjacent part of the reaction zone is advantageously from 1 mbar to 500 mbar, preferably from 1 mbar to 100 mbar, more preferably from 1 mbar to 50 mbar. The adjustment of this differential is known to those skilled in the art, described in WO 2013017609 A1 for example.

The reactor dimensions are dependent on the reaction system and the desired capacity. For the methane pyrolysis reaction system, specific dimensions are described in the example.

The packed reactor of the invention advantageously comprises a random bed of solid particles of electrically conductive material. The bed may be homogeneous or structured over its height. A homogeneous bed may advantageously be a fixed bed, a moving bed or a fluidized bed, especially a moving bed. A bed structured over its height is advantageously a fixed bed in the lower section and a fluidized bed in the upper section. Alternatively, the structured bed is advantageously a moving bed in the lower section and a fluidized bed in the upper section. Alternatively, the solid-state packing advantageously comprises structured internals of electrically conductive material, for example honeycomb monoliths, crossed plates such as Sulzer Mellapak packings, static mixers such as Sulzer SMX mixers or loose particles. The structured internals preferably comprise metal, silicon carbide or carbon and form continuously electrically conductive pathways between the electrodes. Optionally, the hollow volume of the structured internals is wholly or partly filled with solid particles. The solid particles advantageously form a fixed bed, a moving bed, a fluidized bed or a trickle bed. The particles may advantageously consist of electrically conductive and/or electrically insulating materials.

Useful thermally stable, electrically conductive structured packings include internals made of metal and/or electrically conductive ceramics, for example silicon carbide, carbon and composite materials comprising these substances.

"Thermal integration" in the present application is understood to mean a countercurrent heat exchange between a hot stream of matter and a cold stream of matter in a process, the effect of which is that the tangible heat from the hot stream of matter is utilized to heat the cold stream of matter. This achieves a change in temperature of the streams of matter involved without transmission of heat flows beyond the process limits.

The reactor of the invention offers advantageous features for the implementation of a heat-integrated mode of operation for endothermic high-temperature processes. These features are in particular (i) the countercurrent regime between a stream of solid-state particles and a gas stream, and (ii) the adjustment of the position of the heated zone within the reaction zone, which results in a heat transfer zone for reverse heat exchange between the hot product gas and the cold stream of solid-state particles at the upper end and a heat transfer zone for reverse heat exchange between the solid product stream and the cold gas feed at the lower end.

The efficiency of thermal integration is achieved by the minimization of heat transfer resistance between the gas and the solid-state packing by virtue of a favorable ratio of the heat capacity flow rates of the gaseous reaction media and solid reaction media in the heat transfer zones. A measure of the efficiency of the thermal integration is the efficiency of thermal integration: $\eta$=(reaction zone temperature—gas exit temperature of the main stream)/(reaction zone temperature—solids inlet temperature).

The efficiency of thermal integration is advantageously greater than 60%, preferably greater than 65%, further preferably greater than 70%, further preferably greater than 80%, further preferably greater than 90%, especially greater than 95%. The efficiency of thermal integration is advantageously in the range from 60% to 99.5%.

The length of the heat transfer unit is determined predominantly by the parameters of (i) properties of the bulk particles such as particle size, thermal conductivity, coefficient of emission, (ii) properties of the gas phase such as conductivity, and (iii) operating conditions such as pressure, temperature, throughput.

The heat transfer resistance in the heat exchange between the gas and the solid-state packing in the heat transfer zones advantageously has a length of the transfer units or height-of-transfer units (HTU) of 0.01 to 5 m, preferably 0.02 to 3 m, more preferably of 0.05 to 2 m, especially of 0.1 to 1 m. The definition of HTU is adopted from http://elib.uni-stuttgart.de/bitstream/11682/2350/1/docu_FU.pdf page 74.

The heat capacity flow rate is the product of mass flow rate and specific heat capacity of a stream of matter. Advantageously, the ratio of the heat capacity flow rates between the gaseous process stream and the solid process stream is from 0.5 to 2, preferably from 0.75 to 1.5, more preferably from 0.85 to 1.2, especially from 0.9 to 1.1. The ratio of the heat capacity flow rates is adjusted via the feed streams and optionally via the side feeding or side draw removal of substreams.

At the upper end of the reaction zone, especially at the upper edge of the solid-state packing, the difference between the exit temperature of the gaseous product stream and the feed stream of solid-state particles is advantageously from 0 K to 500 K, preferably from 0 K to 300 K, further preferably from 0 K to 200 K, especially from 0 K to 100 K.

At the lower end of the reaction zone, especially at the point where the solid product stream is drawn off from the reactor, the difference between the exit temperature of the solid product stream and the gaseous feed stream is advantageously from 0 K to 500 K, preferably from 0 K to 300 K, further preferably from 0 K to 200 K, especially from 0 K to 100 K.

The middle reactor section advantageously has a connection for a lateral gas side draw. The side draw is advantageously an orifice between the moving bed and a gas-permeable region in the reactor which is isolated from the moving bed and is connected to a separate orifice in the reactor housing. The orifice of the side draw to the reaction zone may advantageously be continuous or divided into segments by fixed channels (19). The fixed channels (19) are preferably integrated into the electrode bars. The channels may be combined to form a ring collector (20). This side draw can advantageously be used to draw off a portion of the reaction gas from the reaction zone.

The side draw is advantageously a region of limited height at the upper end of the heated zone. More preferably, the position of the side draw in relation to the position of the upper electrode is as follows:

The position of the lower end of the side draw in relation to the lower end of the upper electrode is advantageously −2000 to 2000 mm, preferably −1000 to 1000 mm, further preferably −500 to 500 mm, especially −500 to 0 mm. Negative values mean that the lower end of the side draw is lower than the lower end of the upper electrode.

The position of the upper end of the side draw in relation to the lower end of the upper electrode is advantageously −2000 to 3000 mm, preferably −1000 to 2000 mm, further preferably −500 to 1000 mm, especially 0 to 1000 mm. Negative values mean that the upper end of the side draw is lower than the lower end of the upper electrode.

The position of the upper end of the side draw in relation to the upper end of the middle reaction zone is advantageously −3000 to −100 mm, preferably −2000 to −100 mm, further preferably −1000 to −100 mm, especially −500 to −100 mm. Negative values mean that the upper end of the side draw is lower than the upper end of the middle reaction zone.

The proportion of the total volume flow rate which is guided through the side draw is advantageously 0% to 100%, preferably 0% to 80%, further preferably 0% to 60%, especially 0 to 40%.

The side draw reduces the heat capacity flow rate of the gaseous stream in the upper heat transfer zone and matches it to the heat capacity flow rate of the stream of solids to be heated in the moving bed, which flows in countercurrent thereto. The side draw affects the position of the upper heat transfer zone, i.e. the location of the point with the negative temperature gradient of the greatest magnitude in the moving bed. Advantageously, the position of the upper heat transfer zone is at a distance of advantageously 10 to 3000 mm, preferably 100 to 2500 mm, further preferably 200 to 2000 mm, especially 300 to 2000 mm, below the upper end of the moving bed.

A further advantage of the side draw is that the temperature of the stream drawn off is close to the maximum temperature. By virtue of the high temperature, this stream can be utilized efficiently in various ways. The gas stream from the side draw can be used, for example, as reaction gas in a downstream reaction stage (reference to coupling of pyrolysis/reverse water-gas shift reaction).

A further advantage of the side draw is that the electrodes are above the heated zone in a colder temperature region. Thus, in spite of very high temperatures in the heated zone, it is possible to choose materials for the electrodes that are usable only in a colder temperature region.

The carrier materials of the production bed are advantageously thermally stable within the range from 500 to 2000° C., preferably 1000 to 1800° C., further preferably 1300 to 1800° C., more preferably 1500 to 1800° C., especially 1600 to 1800° C.

The carrier materials of the production bed are advantageously electrically conductive within the range between 10 S/cm and $10^5$ S/cm.

Useful thermally stable carrier materials, especially for methane pyrolysis, advantageously include carbonaceous materials, e.g. coke, silicon carbide and boron carbide. Optionally, the carriers have been coated with catalytic materials. These heat carrier materials may have a different expansion capacity with respect to the carbon deposited thereon.

The granule particles have a regular and/or irregular geometric shape. Regular-shaped particles are advantageously spherical or cylindrical.

The granules advantageously have a grain size, i.e. an equivalent diameter determinable by sieving with a particular mesh size, of 0.05 to 100 mm, preferably 0.1 to 50 mm, further preferably 0.2 to 10 mm, especially 0.5 to 5 mm.

Also advantageous is the use of carbonaceous material, for example in granular form. A carbonaceous granular material in the present invention is understood to mean a material that advantageously consists of solid grains having at least 50% by weight, preferably at least 80% by weight, further preferably at least 90% by weight, of carbon, especially at least 90% by weight of carbon.

It is possible to use a multitude of different carbonaceous granular materials in the process of the invention. A granular material of this kind may, for example, consist predominantly of charcoal, coke, coke breeze and/or mixtures thereof. In addition, the carbonaceous granular material may comprise 0% to 15% by weight, based on the total mass of the granular material, preferably 0% to 5% by weight, of metal, metal oxide and/or ceramic.

An advantageous variant of the reactor design of the invention is a catalytic fixed bed reactor with direct electrical heating. FIG. 21 shows a diagram of the reactor of the invention. The reactor is advantageously divided into multiple zones. Advantageously, the arrangement from the top downward is as follows: the gas inlet (73), the upper electrode (4), the heated zone, the lower electrode (5), the exit of the gaseous product stream (74).

The reactor is partly filled with a random or structured packing of electrically conductive material. The packing rests on the catalyst base (72) which is in turn secured to the lower reactor hood by a connecting element, for example a skirt. Advantageously, the upper and lower electrodes (4) and (5) are respectively disposed at the upper and lower ends of the solid-state packing.

The term "high-temperature processes" encompasses pyrolysis reactions, dehydrogenation reactions, reforming reactions inter alia.

According to the invention, the endothermic high-temperature process is preferably a process wherein the volume-specific energy consumption in the heated zone is greater than 0.5 MW/m$^3$, more preferably greater than 1 MW/m$^3$, especially greater than 2 MW/m$^3$. For example, the energy consumption may be between 0.5 and 10 MW/m$^3$ in the heated zone.

Preference is given to conducting the following high-temperature reactions in the moving bed reactor of the invention:

Preparation of synthesis gas by reforming of hydrocarbons with steam and/or carbon dioxide, coproduction of hydrogen and pyrolysis carbon by the pyrolysis of hydrocarbons. Suitable carrier materials are especially carbonaceous granules, silicon carbide-containing granules, nickel-containing metallic granules.

Preparation of hydrogen cyanide from methane and ammonia or from propane and ammonia. Suitable carrier materials are especially carbonaceous granules.

Preparation of olefins by steamcracking of hydrocarbons. Suitable carrier materials are especially carbonaceous granules, silicon carbide-containing granules.

Coupling of methane to ethylene, acetylene and benzene.

Preparation of olefins by catalytic dehydrogenation of alkanes, for example propylene from propane or butene from butane. Suitable carrier materials are especially silicon carbide-containing granules coated with dehydrogenation catalysts or iron-containing shaped bodies.

Preparation of styrene by catalytic dehydrogenation of ethylbenzene. Suitable carrier materials are especially silicon carbide-containing granules coated with dehydrogenation catalysts or iron-containing shaped bodies.

Preparation of diolefins by the catalytic dehydrogenation of alkanes or olefins, for example butadiene from butene or from butane. Suitable carrier materials are especially silicon carbide-containing granules coated with dehydrogenation catalysts or iron-containing shaped bodies.

Aldehydes by catalytic dehydrogenation of alcohols, for example anhydrous formaldehyde from methanol. Suitable carrier materials are especially silver-containing granules or silicon carbide-containing granules coated with dehydrogenation catalysts or iron-containing shaped bodies.

Preparation of CO by the Boudouard reaction from CO2 and carbon. Suitable carrier materials are especially carbonaceous granules.

Preparation of hydrogen and oxygen by catalytic water thermolysis over catalysts. Suitable carrier materials are especially silicon carbide-containing or iron-containing granules coated with a cleavage catalyst, for example a ferrite.

For the preferred variants of the process of the invention, the ranges for the target values for the maximum temperature are summarized in tabular form:

Advantageously, the temperature of the upper electrode is at least 350° C., advantageously in the range from 350 to 1900° C.

The contact connection of the electrodes via the flat end sections of the reactor housing or a connecting element secured thereto and additionally, optionally, the use of refractory metals as electrode material enables the low-loss introduction of the electrical current into the reaction zone. By virtue of the high cross-sectional areas and the high specific electrical conductivity of the reactor hoods and optionally of the connecting elements, the electrical power dissipated therein is negligibly small. As a result, the connections, bushings and connections in this region are kept at a moderate temperature level without complex active cooling. By virtue of the mutually matched dimensions of the cross-sectional areas of the electrodes and of the connecting elements, a uniform distribution of the electrical current over the cross section of the solid-state packing is achieved.

The contact connection of the electrodes over the circumference of the hoods and optionally in combination with the geometry of the electrodes in grid form allows homogeneous introduction of the electrical current into the reaction zone. In addition, the geometry of the electrodes in grid form allows the structuring of the reactor cross section in small, uniform regions. This results in beneficial prerequisites for rational scaling and adaptation of the reactor to the required production capacity.

The vertical arrangement of the electrodes enables uniform release of heat and a uniform conversion profile across the heated region of the reaction zone. The preferred execution of the electrodes with electrode bars in bar form and associated electrode plates has high mechanical stability. The segmenting of the electrodes and the single-sided fixing allows unhindered thermal expansion of the electrodes.

The high degree of slimness and the profiling of the electrode bars and of the electrode plates with sharp ends allow unhindered flow of the solid-state particles in the moving bed. This assures uniform operating conditions over the entire cross section of the reaction zone.

The positioning of the electrodes within the packing gives rise to two defined heat transfer zones in which internal recycling of heat can be achieved above and below the

| | Target value for the maximum temperature | | | |
|---|---|---|---|---|
| | min [° C.] | | max [° C.] | |
| Reaction | Lower limit | Preferred lower limit | Preferred upper limit | Upper limit |
| Pyrolysis (natural gas, liquefied gas, naphtha) | 800 | 1000 | 1700 | 1900 |
| Reforming of natural gas (steam/CO2) | 600 | 750 | 1300 | 1500 |
| Alkane ammodehydrogenation | 1000 | 1200 | 1700 | 1900 |
| Steamcracking | 600 | 750 | 1300 | 1500 |
| Coupling of methane to give C2, C3 hydrocarbons | 500 | 600 | 1500 | 1800 |
| Dehydroaromatization (natural gas) | 600 | 700 | 800 | 900 |
| Dehydrogenation of propane, raffinate II or ethylbenzene | 450 | 500 | 650 | 700 |
| Dehydrogenation of butene to butadiene | 350 | 450 | 700 | |
| Dehydrogenation of methanol to formaldehyde | 500 | 600 | 800 | 1100 |
| Boudouard reaction | 450 | 500 | 1000 | 1300 |
| Thermolysis of water to H2 and O2 (regeneration of the catalyst) | 600 | 700 | 1100 | 1500 | electrically heated region of the packing. As a result, the reactor has the prerequisites for complete thermal integration.

As a result of the positioning of the upper edge of the solid-state packing within the middle reactor section, the high-temperature zone is reliably bounded within the mechanically and thermally robust region of the reactor.

The division of the housing into three sections facilitates the ease of assembly and dismantling of the reactor. This makes it possible to exchange worn parts in a simple manner and to utilize prefabricated reactor sections for the construction of the reactor. Consequently, the economic viability and manufacturing quality of the reactor are improved.

FIG. 1 shows the diagram of a moving bed reactor of the invention with direct electrical heating.
  a. Longitudinal section through the reactor.
  b. Cross section of the reactor at the height of the upper electrode. In this view, the cross section of the connecting element 10 is visible.
  c. Side view of the unwinding of the skirt of the upper electrode. In this view, the cross section of the electrode 4 is visible.

Figure 12:
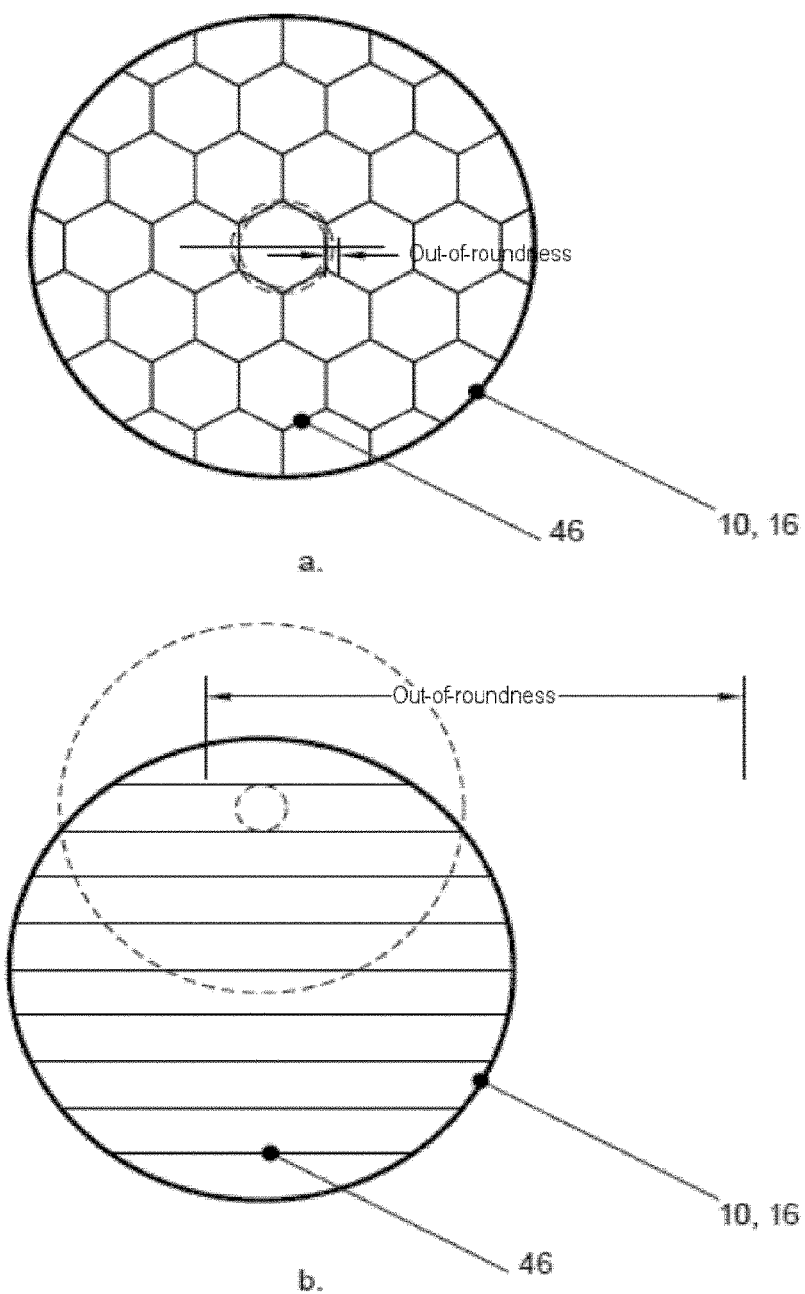
Figure 13:
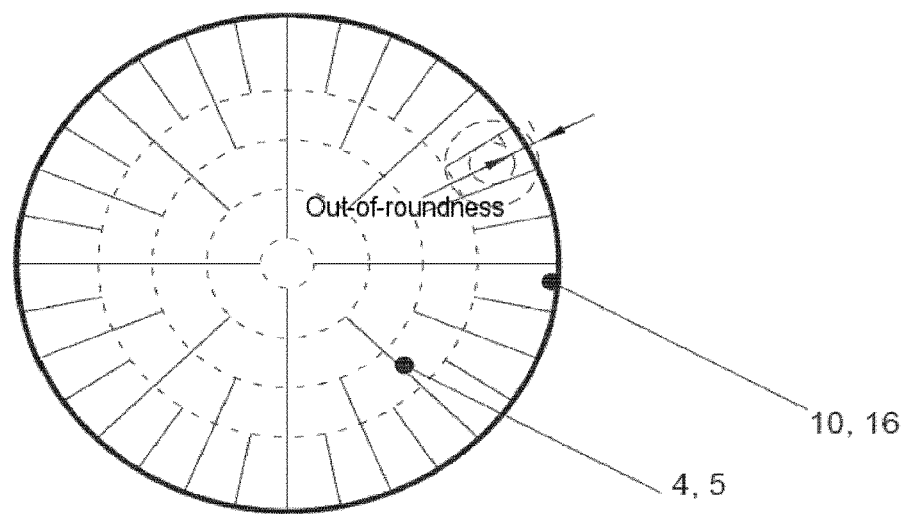
Figure 13:
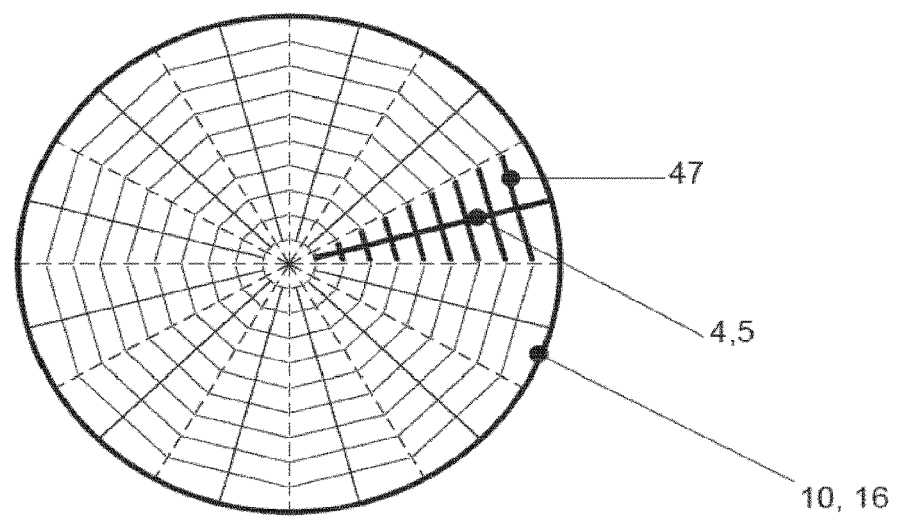
Figure 14:
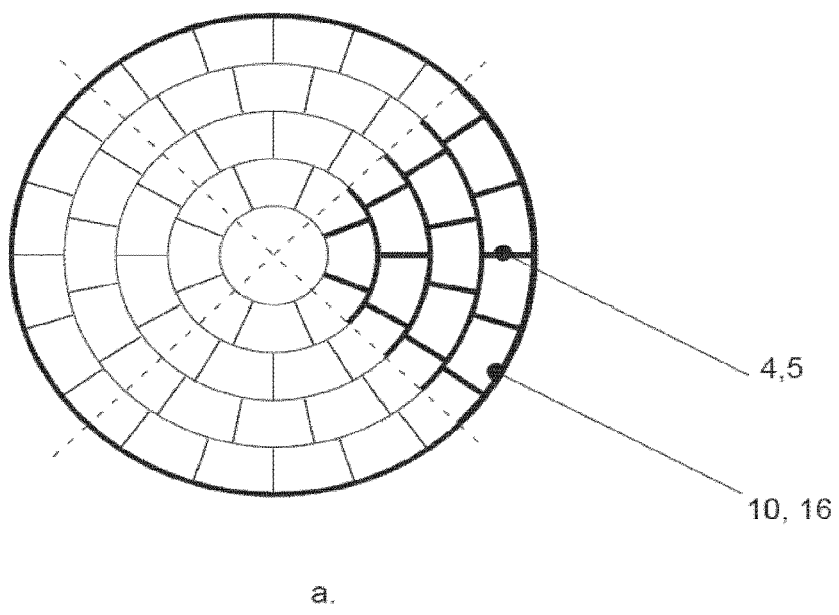
Figure 14:
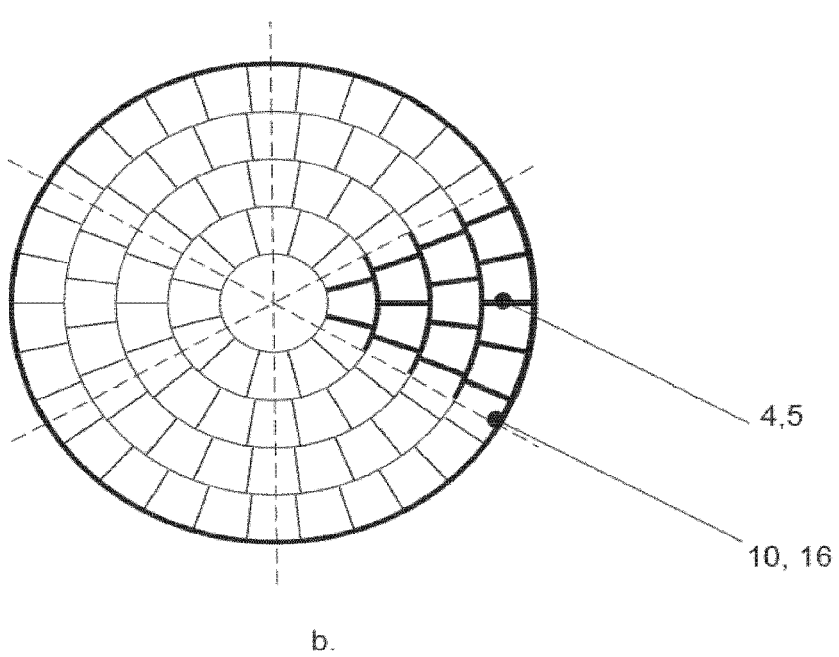
Figure 15:
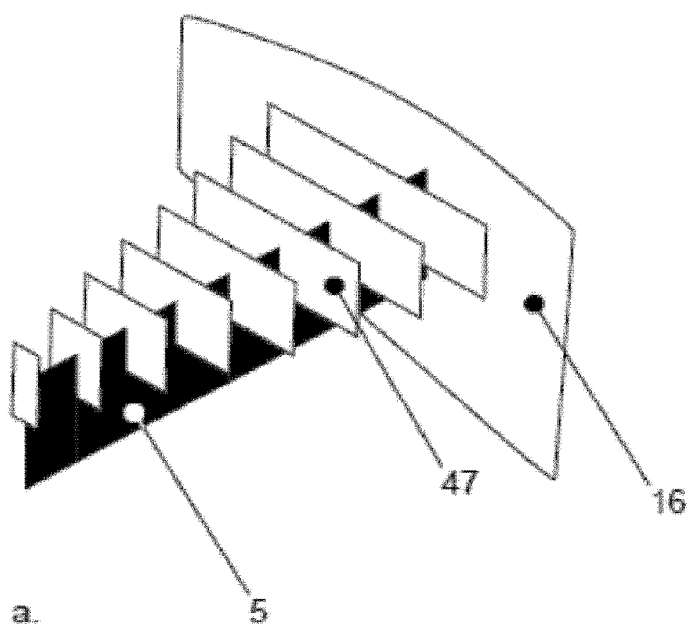
Figure 15:
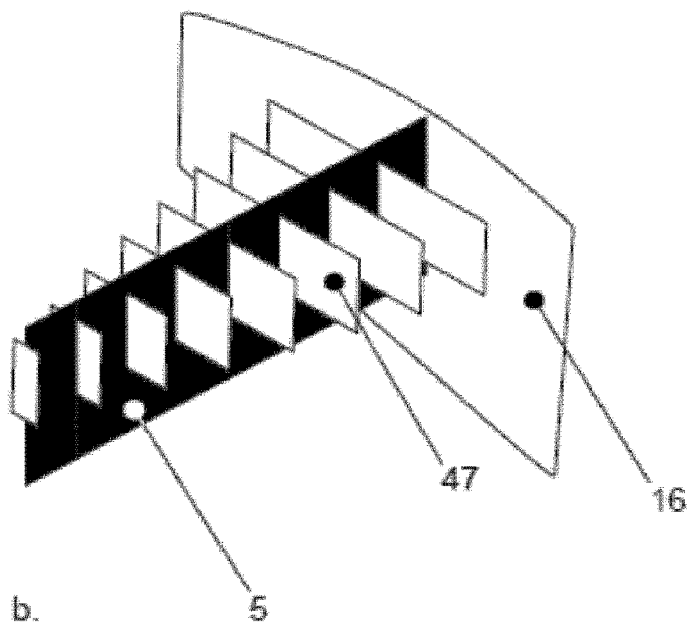

FIG. 12 shows an advantageous top view of electrodes in grid form.
  a. Grid in honeycomb form. The cells may be regular or irregular polygons. Number of sides: 3 to 20.
  b. Rectangular grid FIG. 13 shows a preferred top view of electrodes in grid form.
  a. Grid divided in the form of spokes
  b. Grid divided in the form of spokes with lateral bars FIG. 14 shows a particularly preferred top view of electrodes in grid form. The dotted lines show the boundaries of the segments.
  a. Ring-shaped "fractally scaled" grid, divided into four segments
  b. Ring-shaped "fractally scaled" grid, divided into six segments FIG. 15 shows a segment of an electrode in grid form divided in accordance with the invention, consisting of an electrode bar secured to the skirt of the reactor hood and plates arranged orthogonally thereto.
  a) The electrode bar protrudes on the bottom side and the plates protrude on the top side.
  b) The electrode bar protrudes upward and downward.

Figure 16:
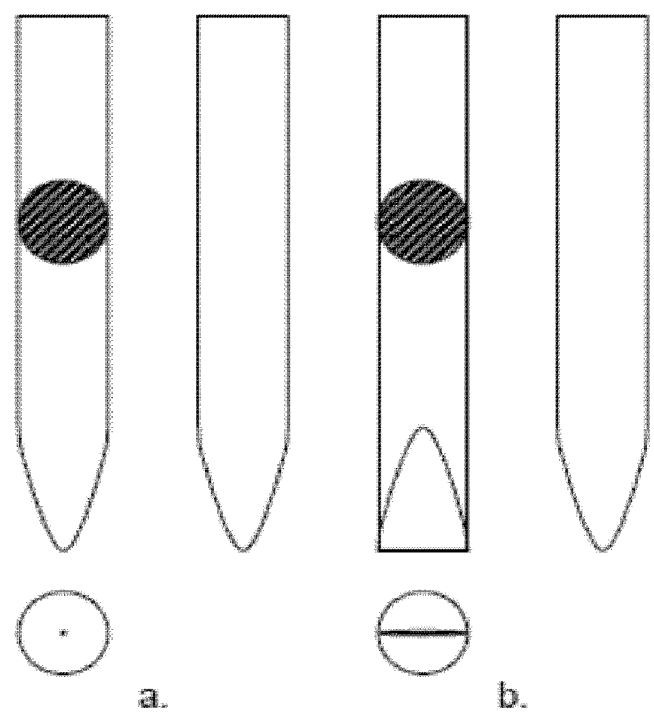

FIG. 16 shows rod electrodes of the invention.
  a) Rod electrode with conical end: front view (left), side view (right), top view (bottom).
  b) Rod electrode with wedge-shaped end: front view (left), side view (right), top view (bottom).

Figure 17:
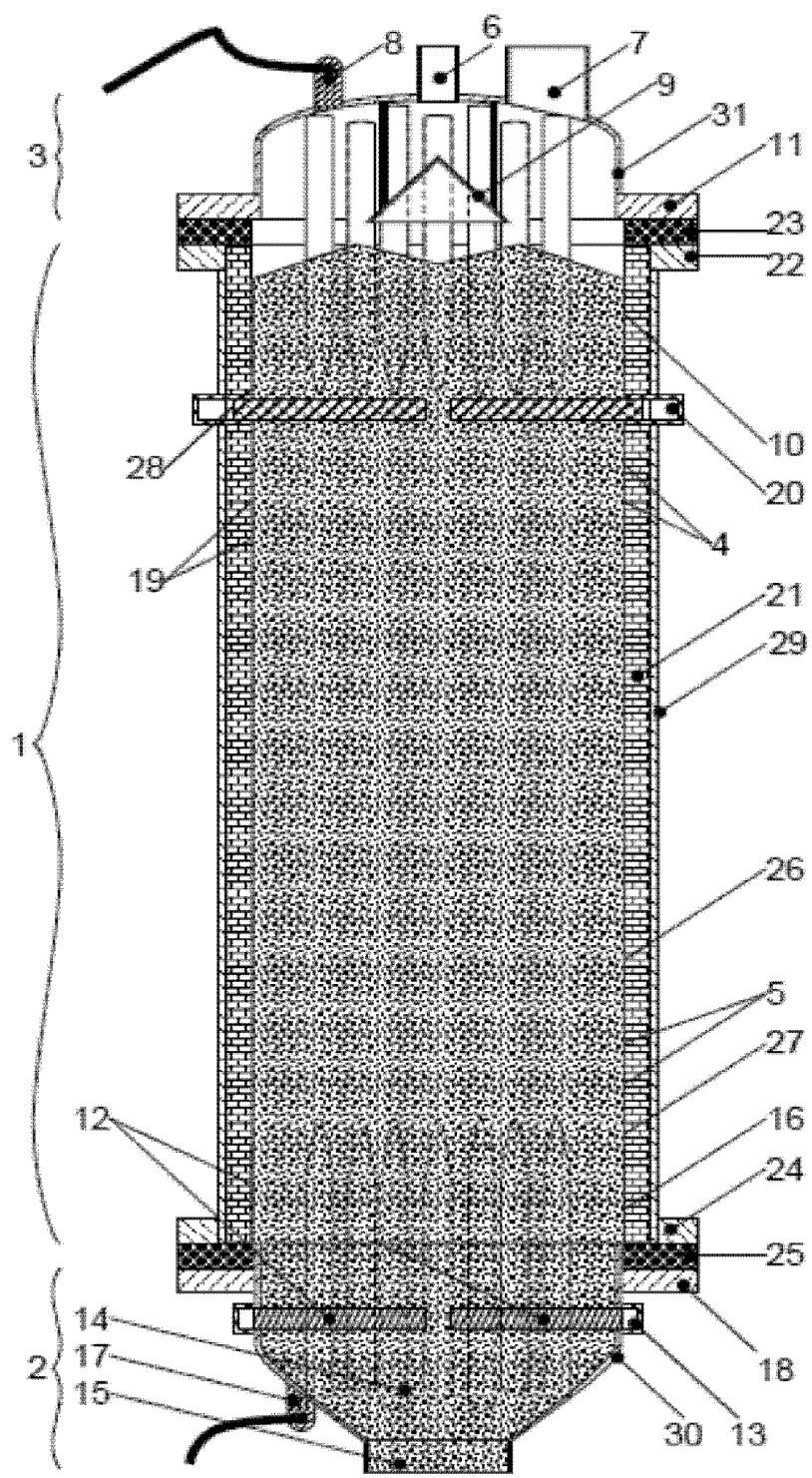

FIG. 17 shows the diagram of a moving bed reactor of the invention with direct electrical heating with rod electrodes.

Figure 18:
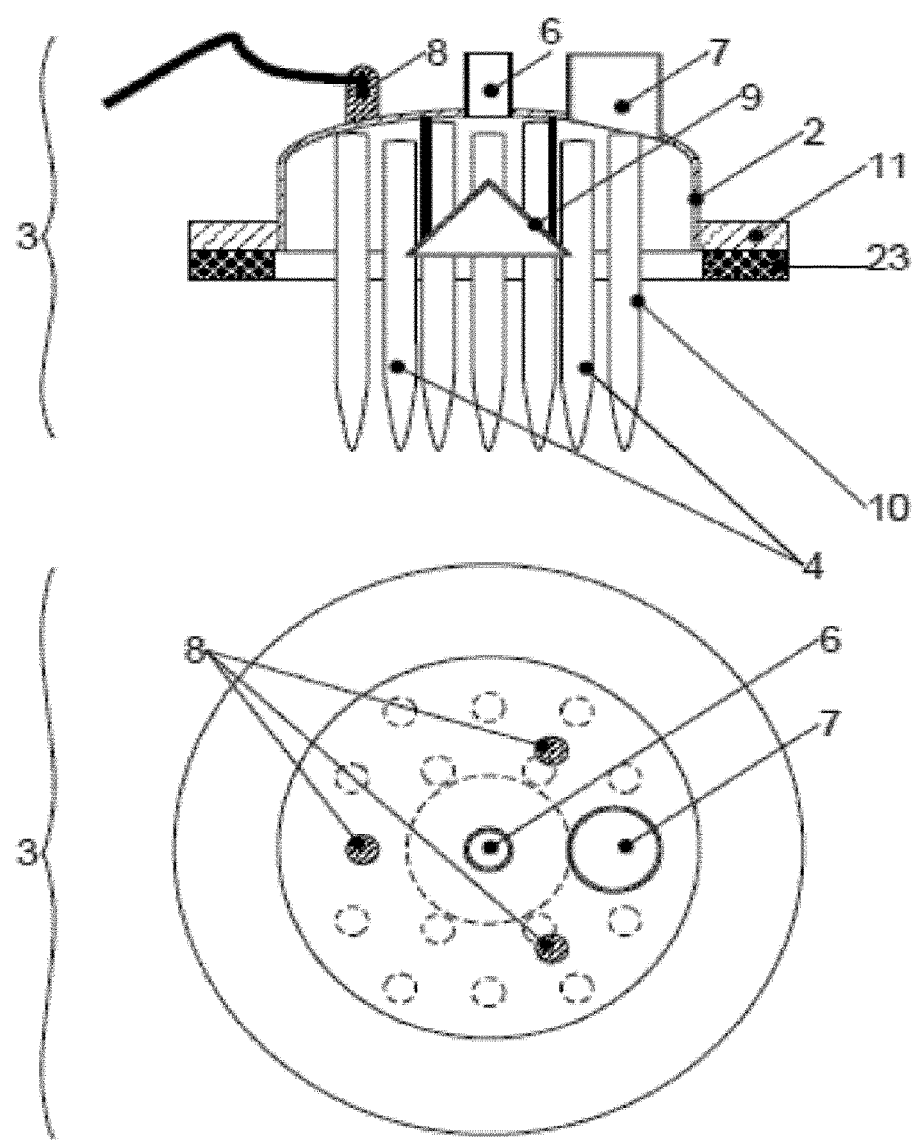

FIG. 18 shows a detail diagram of the upper reactor hood with rod electrodes in side view (top) and in top view (bottom).

Figure 19:
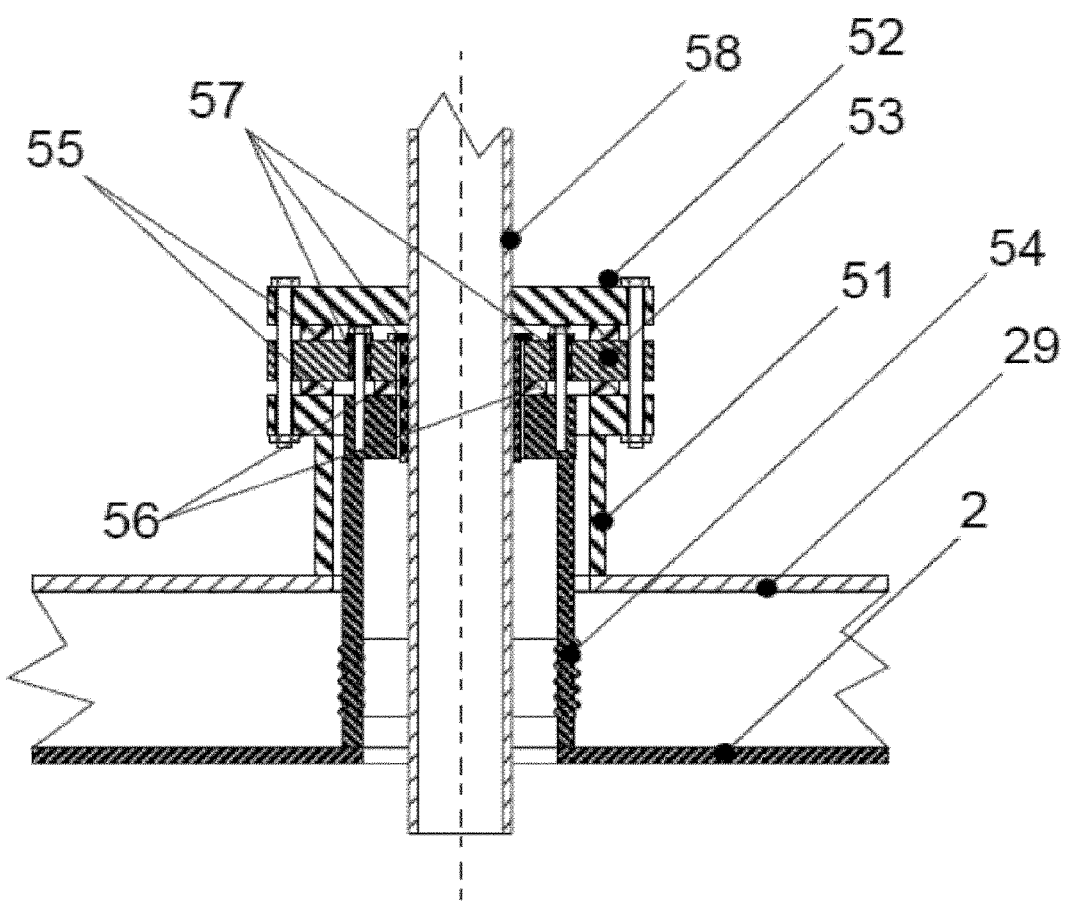

FIG. 19 shows a diagram of the bushing of the invention through the outer shell of the upper hood for the entry of the stream of solid particles.

Figure 20:
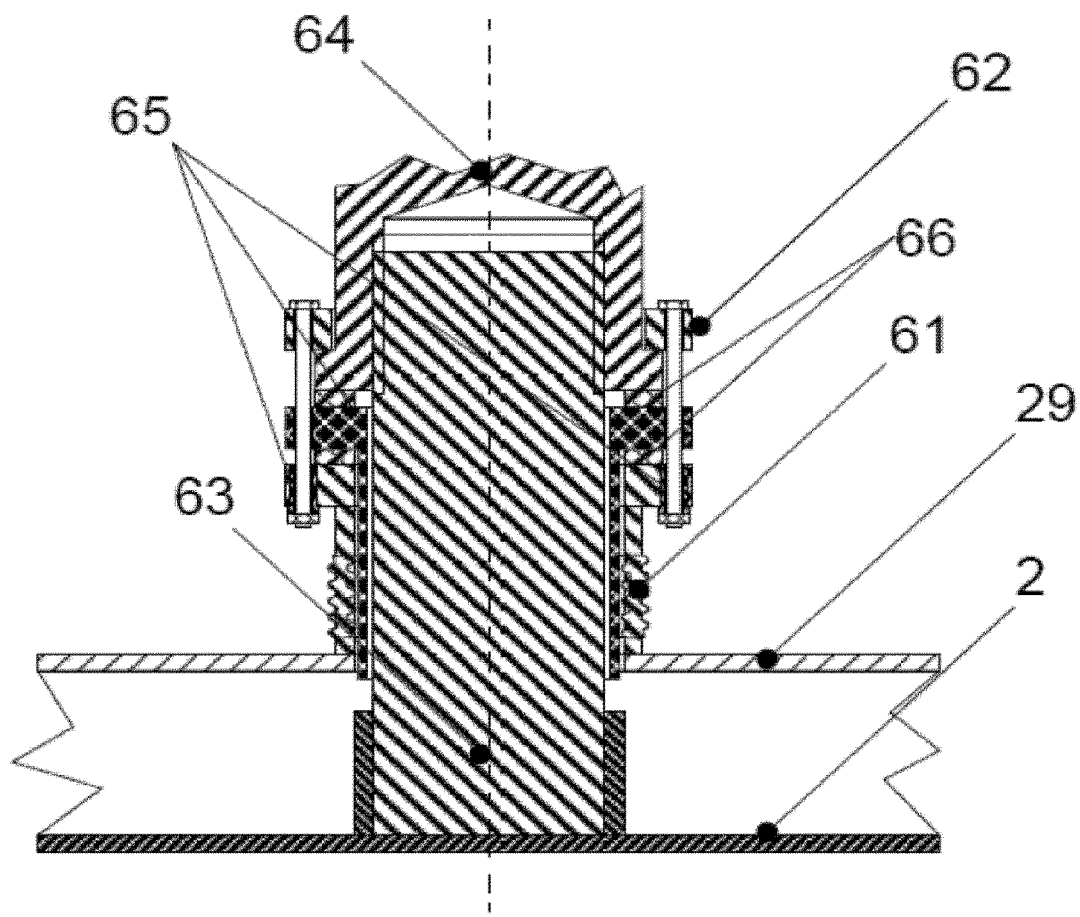

FIG. 20 shows a diagram of the bushing of the invention through the outer shell of the upper hood for the connection rail for the electrical current.

Figure 21:
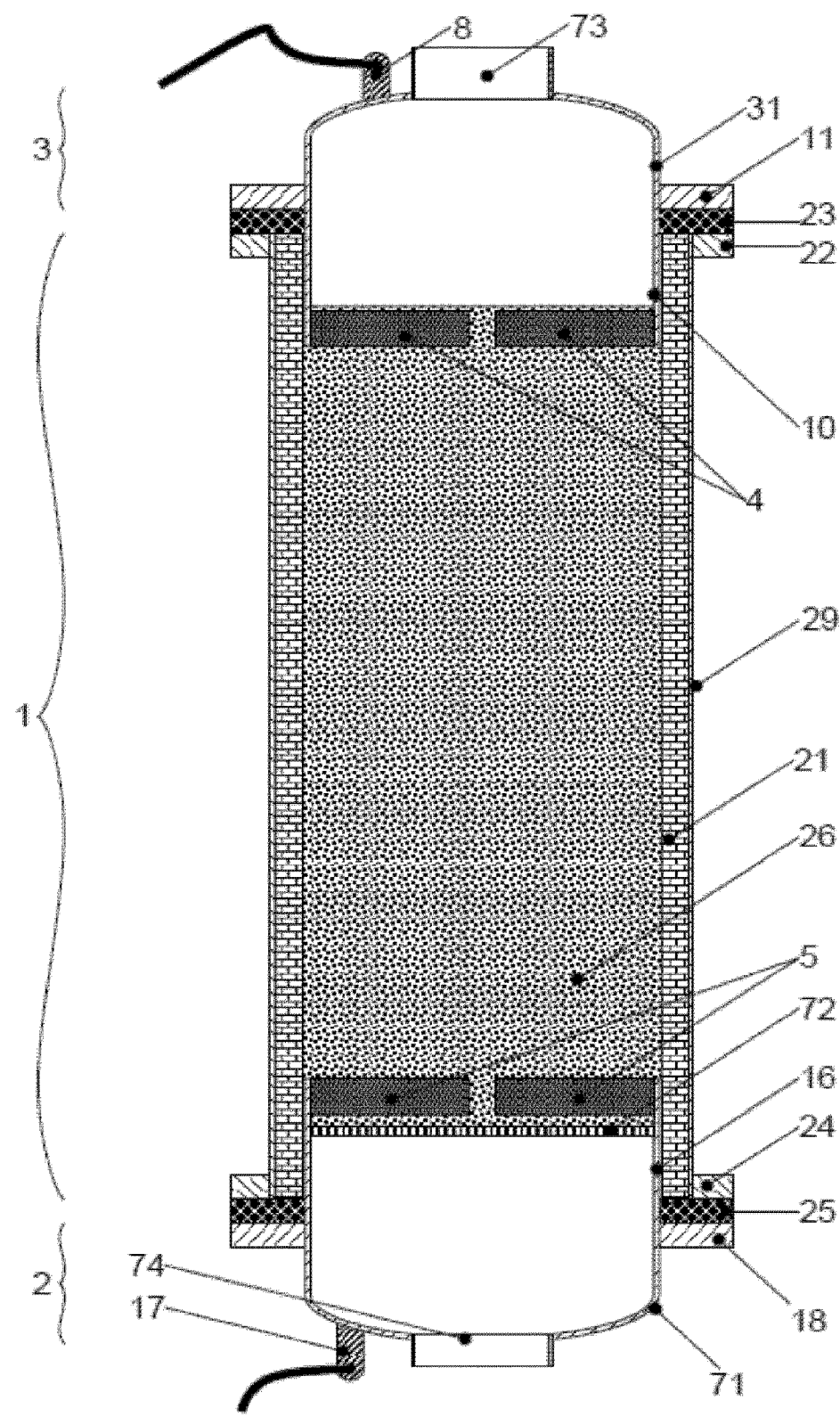

FIG. 21 shows the diagram of a fixed bed reactor of the invention with direct electrical heating.

Figure 22:
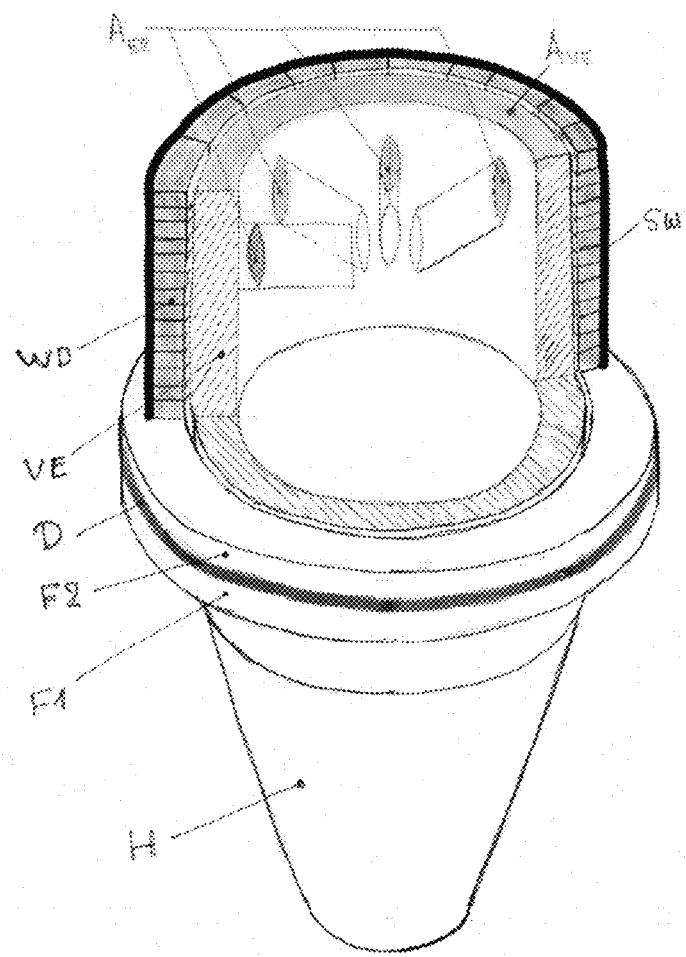

FIG. 22 shows a hand-drawn sketch of an upper or lower apparatus section of the invention for illustration of the calculation of the ratio of the cross-sectional areas of the upper or lower electrode ($A_{EI}$) to the cross-sectional area of the respective current-conducting connecting element ($A_{VE}$).

Figure 23:
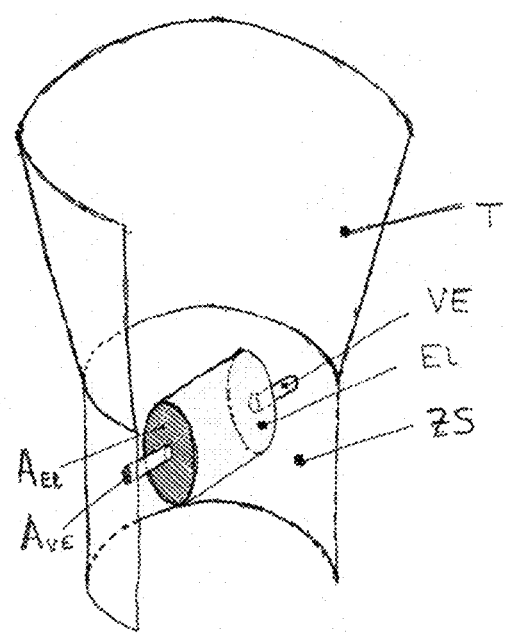

FIG. 23 shows a hand-drawn sketch of a prototype of the electrode connection analogous to the drawings of U.S. Pat. No. 5,903,591 for illustration of the calculation of the ratio of the cross-sectional areas of the electrode ($A_{EI}$) to the cross-sectional area of the respective current-conducting connecting element ($A_{VE}$).

LEGEND 1. middle section of the reactor
2. upper end section of the reactor/upper reactor hood/upper apparatus section
3. lower end section of the reactor/lower reactor hood/lower apparatus section
4. electrode bars of a divided upper electrode
5. electrode bars of a divided lower electrode
6. entry of stream of solid particles
7. exit of the gaseous product stream
8. connection rail for the electrical current in the upper reactor hood
9. cone distributor
10. connecting element/skirt in the upper reactor hood for contact connection of the electrodes
11. flange to the upper reactor hood
12. plate distributor for the gaseous reactants stream
13. ring distributor for the gaseous reactants stream
14. conical-shaped lower reactor hood
15. exit of the solid product stream
16. connecting element/skirt in the lower reactor hood for contact connection of the electrodes
17. connection rail for the electrical current in the lower reactor hood
18. flange to the lower reactor hood
19. channels for the side draw removal of a gaseous substream from the reaction zone
20. ring collector for the side draw
21. lining of the reactor shell with a refractory, electrically and thermally insulating brick lining 22. flange at the upper end of the reactor shell
23. electrically insulating intermediate ring between the flanges of the upper hood and the reactor shell
24. flange at the lower end of the reactor shell
25. electrically insulating intermediate ring between the flanges of the upper hood and the reactor shell
26. heated zone in the particle bed/in the moving bed
27. lower heat transfer zone in the particle bed/in the moving bed
28. upper heat transfer zone in the particle bed/in the moving bed
29. housing wall of the middle reactor section
30. housing wall of the lower reactor hood
31. housing wall of the upper reactor hood
41. outer shell of the upper reactor hood/upper apparatus section
42. flange to the upper reactor hood/lower apparatus section
43. electrically insulating, gas-tight bushings in the outer shell of the upper reactor hood
44. entry of purge stream for the gap between the inner shell and outer shell of the upper hood
45. exit of purge stream from the gap between the inner shell and outer shell of the upper hood
46. bars of an electrode grid in grid form continuously mounted rigidly in the skirt of the reactor hood
47. plates or lateral bars secured at one end on the electrode bars of a divided electrode
51. stub on the outer shell with welding flange
52. connection conduit with welding flange
53. intermediate ring
54. stub on the inner shell with compensator and welded-on threaded plate
55. gaskets for the connection of the flange (51) and (52) to the intermediate ring (53)
56. gaskets for the connection between the threaded plate (54) and the intermediate ring (53)
57. sleeves of electrically insulating material
58. inlet pipe for the stream of solid particles
61. stub on the outer shell with compensator and welding flange
62. loose flange
63. connecting pin for the electrical current from the inner shell of the hood
64. connecting bush for the electrical current as counterpart to (63)
65. sleeves of electrically insulating material
66. gaskets for connection of the flanges (61) and (62) to the sleeve (65)
67: sleeve of electrically insulating material
71. upper end section of the reactor housing/upper reactor hood/upper apparatus section in the form of a dished end
72. catalyst base to support the catalytic fixed bed
73. entry of the gaseous reactant stream
74. exit of the gaseous product stream
$A_{EI}$: cross-sectional area of the electrode
$A_{VE}$: cross-sectional area of the connecting element
VE: connecting element
H: hood
D: sealing and insulation ring
SW: side wall
WD: thermal insulation/lining
F1: flange on the hood
F2: flange on the side wall
El: electrode
T: funnel
ZS: cylindrical shaft

EXAMPLES

Comparative Example (in Analogy to U.S. Pat. No. 5,946,342)

Methane pyrolysis is to be conducted in a moving bed reactor with direct electrical heating. The volume flow rate of the gaseous reactant is 11 000 m³ (STP)/h. The stream comprises 65 vol % of methane, 15 vol % of hydrogen and nitrogen at about 20 vol %. The solid reactant stream, which is introduced into the reactor from the top, is 11.45 t/h. The particle stream consists of coke having a carbon content of >99.5%. The diameter of the reaction zone is 3400 mm; the height of the electrically heated zone is 2000 mm. At the upper and lower ends of the heated zone are disposed graphite electrodes in grid form, via which the electrical current is introduced into the solid-state packing of the moving bed. Above the upper electrode is a 1000 mm-long heat transfer zone. Analogously, below the lower electrode, there is a 1000 mm-long heat transfer zone. An electrical current of 70 000 A is to be introduced into the reactor. The introduction of the electrical current is accomplished via twelve cylindrical electrode feeds made of graphite, which are arranged at the level of the respective electrode in a star shape and uniformly across the circumference of the reactor shell. The electrode feeds have a diameter of 100 mm and a length of 1000 mm. In the electrode feeds, 1000 kW are converted to heat. This power corresponds to 12.5% of the process power required. As lost power, it adversely affects the energy balance of the process. In addition, the electrical energy dissipated to heat has to be removed. It is problematic here that the volume-specific development in the electrode feeds is 6.2 MW/m³. Correspondingly, the heat flow density at the surface of the electrode feed is 154 kW/m². This heat flow density, without controlled intensive cooling at the surface of the electrode feed, can cause excess temperatures greater than 1000 K. With these settings, a methane conversion of 94.2% is achieved. The maximum temperature in the reactor is 1230° C. The temperature differential between the solid product stream and the gaseous reactant stream at the lower end of the reactor is virtually zero and the temperature differential between the gaseous product stream and the solid reactant stream at the upper end of the reactor is 315 K. Since the excess heat is obtained at a moderate temperature level, it can be converted to mechanical energy only with a low efficiency.

Inventive Example

Methane pyrolysis is to be conducted in a moving bed reactor with direct electrical heating. The volume flow rate of the gaseous reactant is 11 000 m³ (STP)/h. The stream comprises 65 vol % of methane, 15 vol % of hydrogen and nitrogen at about 20 vol %. The solid reactant stream, which is introduced into the reactor from the top, is 13.5 t/h. The particle stream consists of coke with a carbon content of >99.5%. The diameter of the reaction zone is 3400 mm; the height of the electrically heated zone is 2000 mm. At the upper and lower ends of the heated zone are disposed molybdenum electrodes in grid form, by means of which the electrical current is introduced into the solid-state packing of the moving bed. The electrode is designed as a divided grid in the form of spokes with side bars. It comprises 12 electrode bars (spokes) and eight electrode plates (side bars) per electrode bar.

Figure 1A:
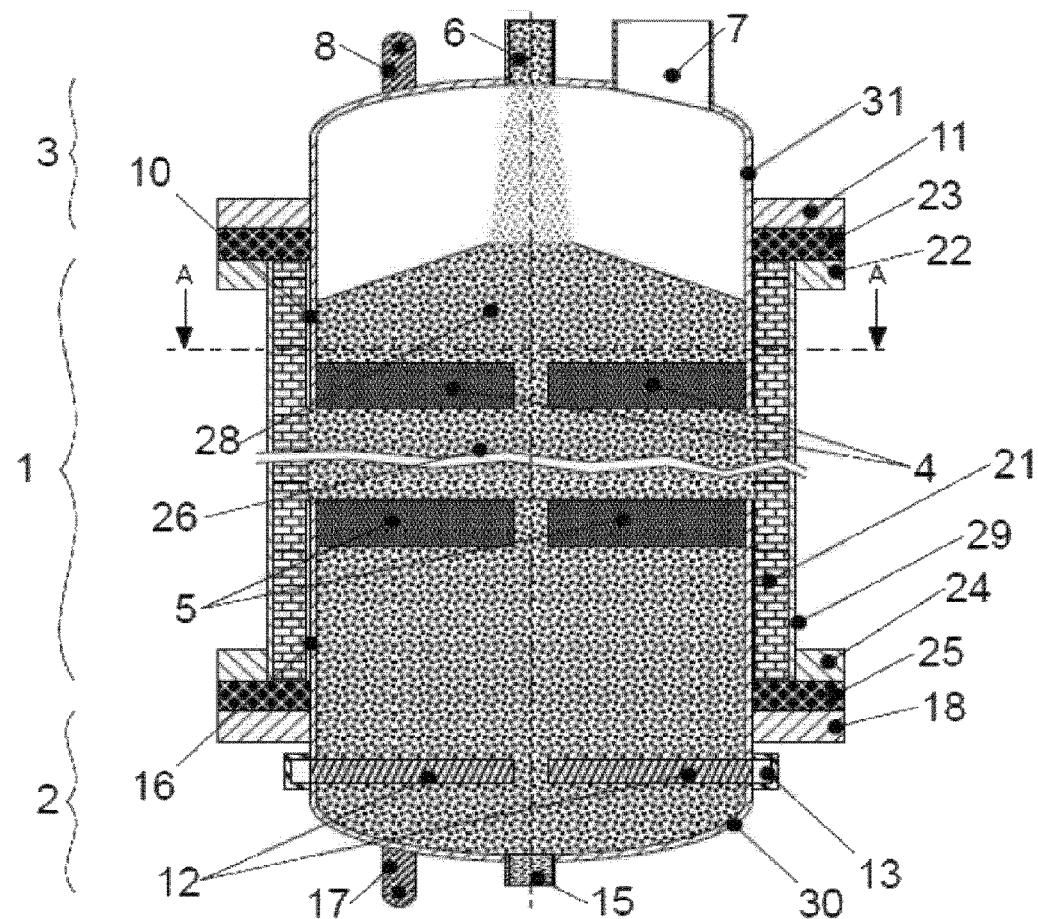
Figure 1B:
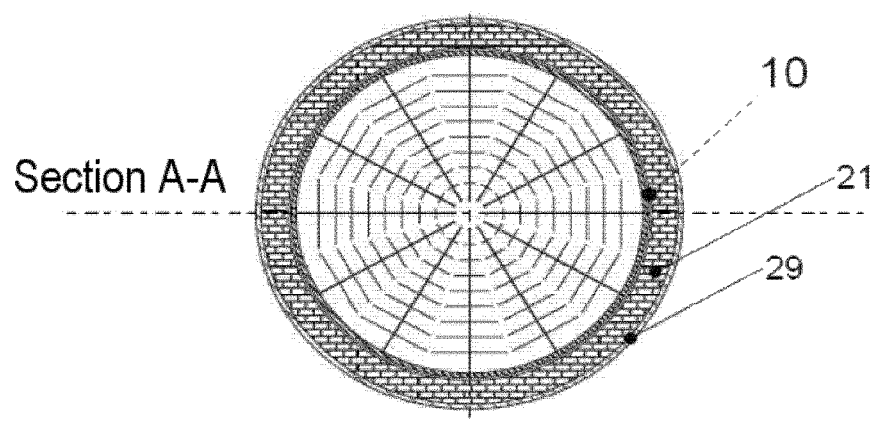
Figure 1C:
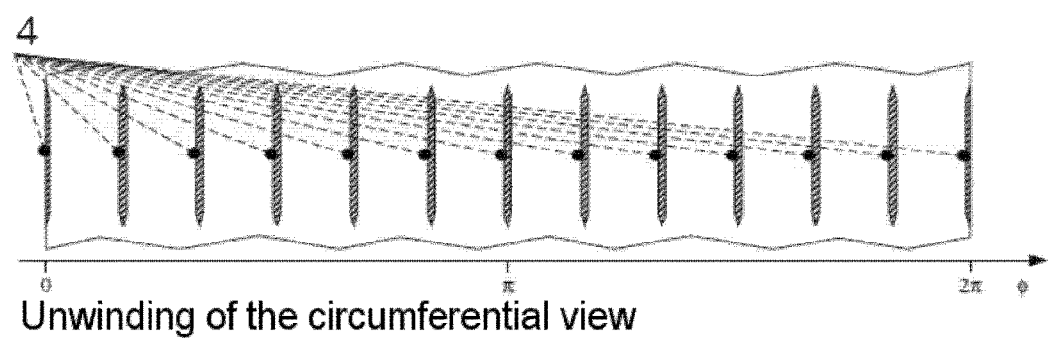
Figure 2:
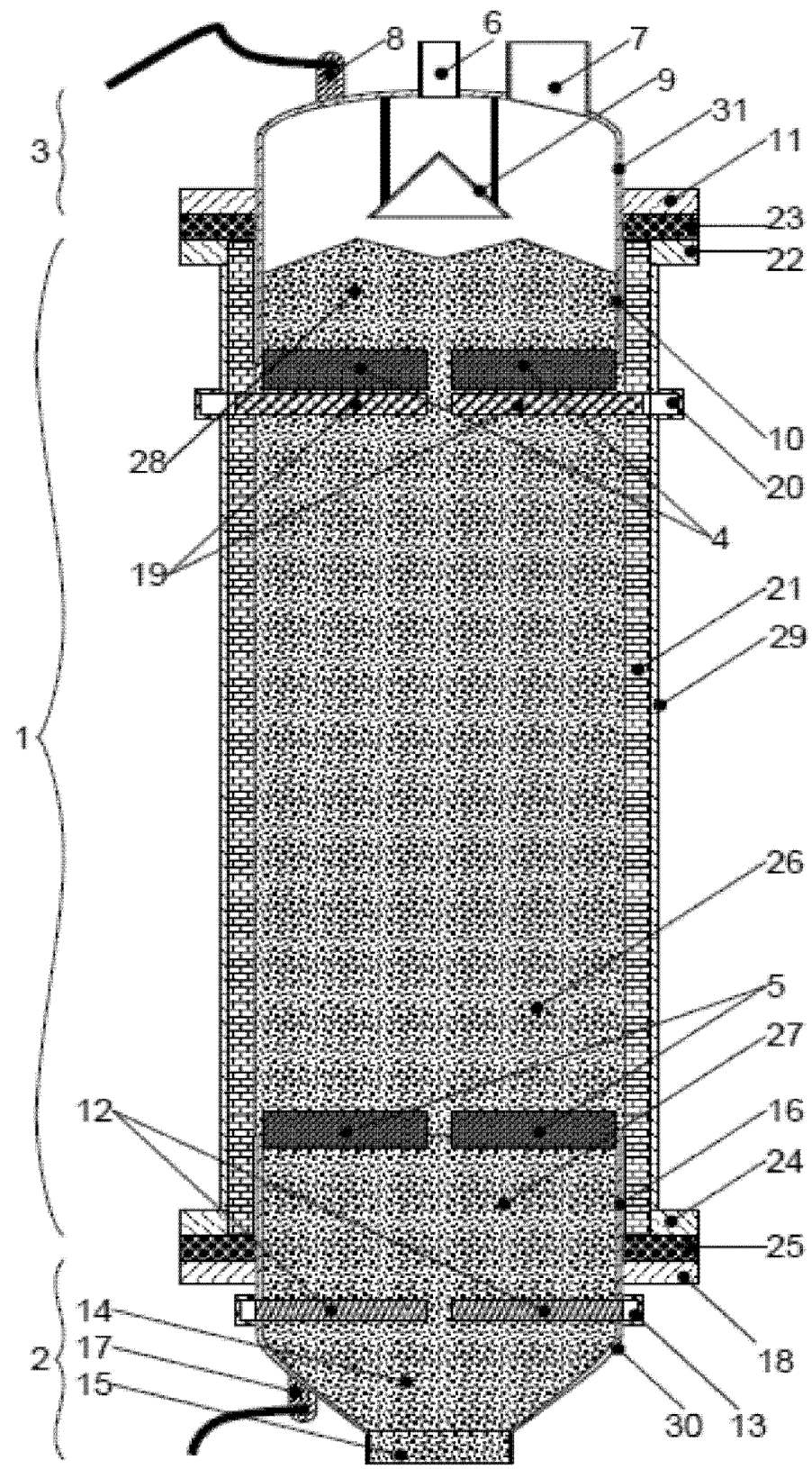
FIG. 2 shows the diagram of a moving bed reactor of the invention with direct electrical heating.
Figure 3:
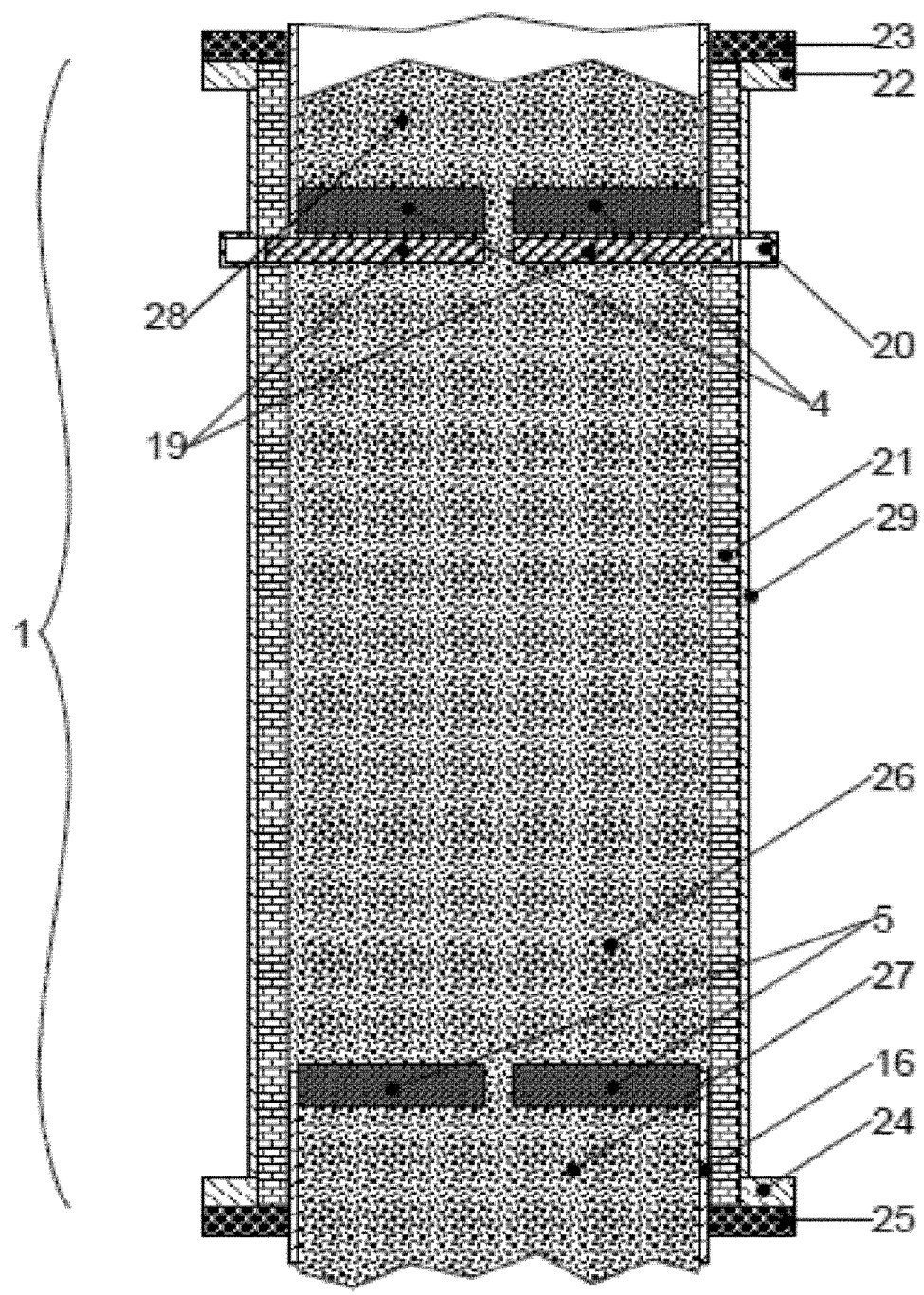
FIG. 3 shows a detail drawing of the middle section of the reactor housing.
Figure 4:
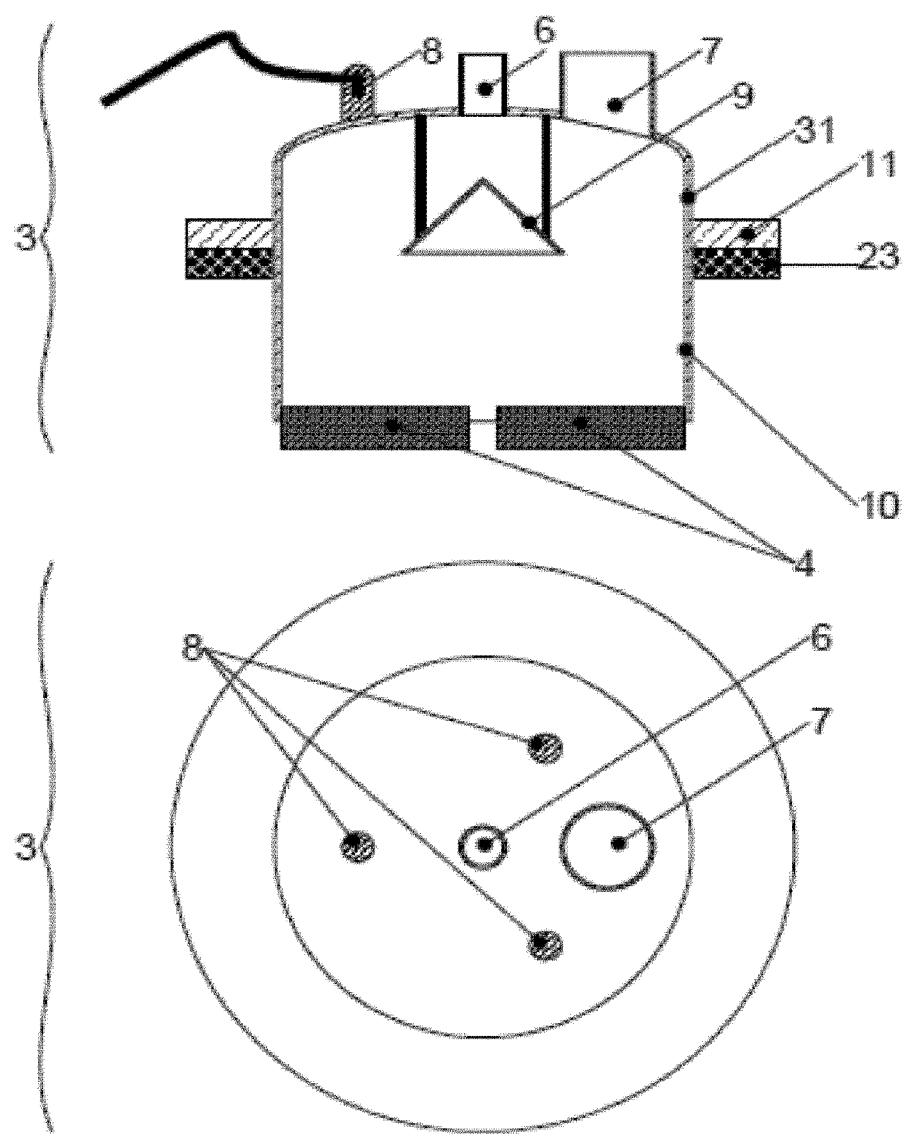
FIG. 4 shows a detail drawing of the upper reactor hood in side view (top) and in top view (bottom).
Figure 5:
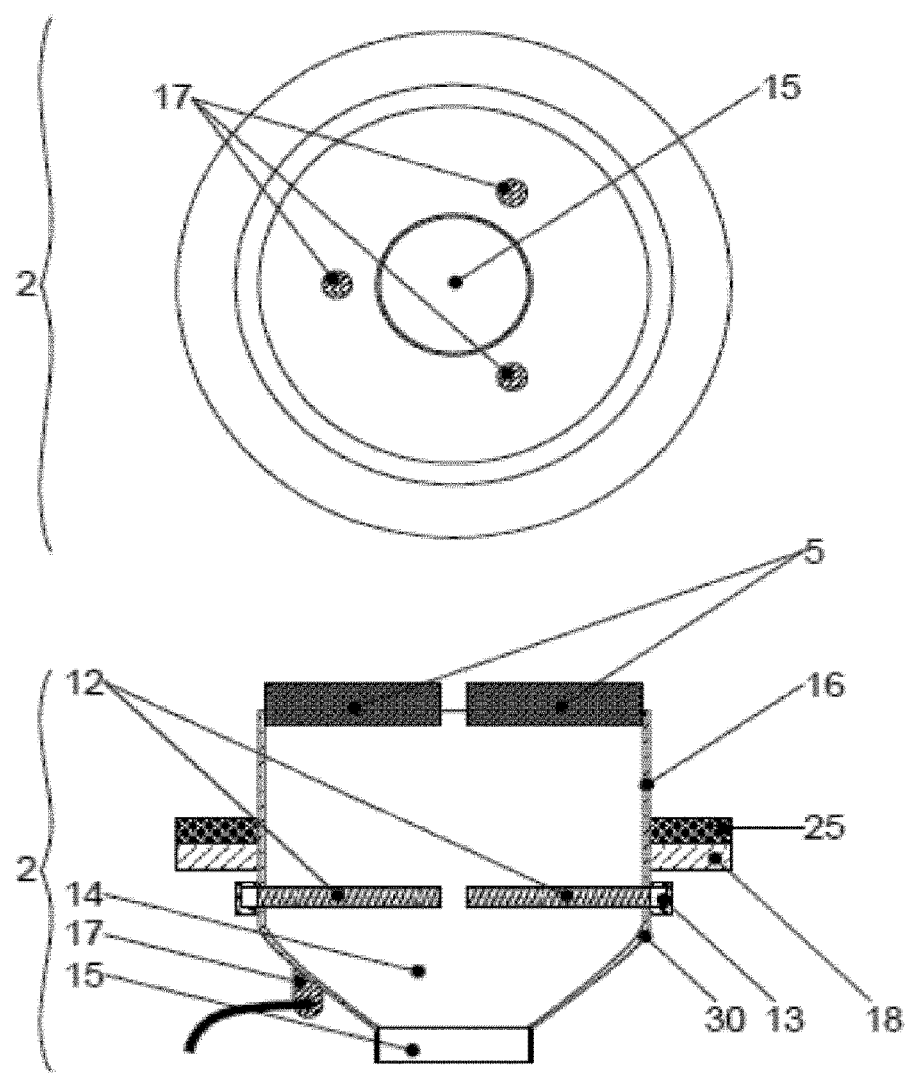
FIG. 5 shows a detail drawing of the lower reactor hood in side view (bottom) and in the view from below (top).
Figure 6:
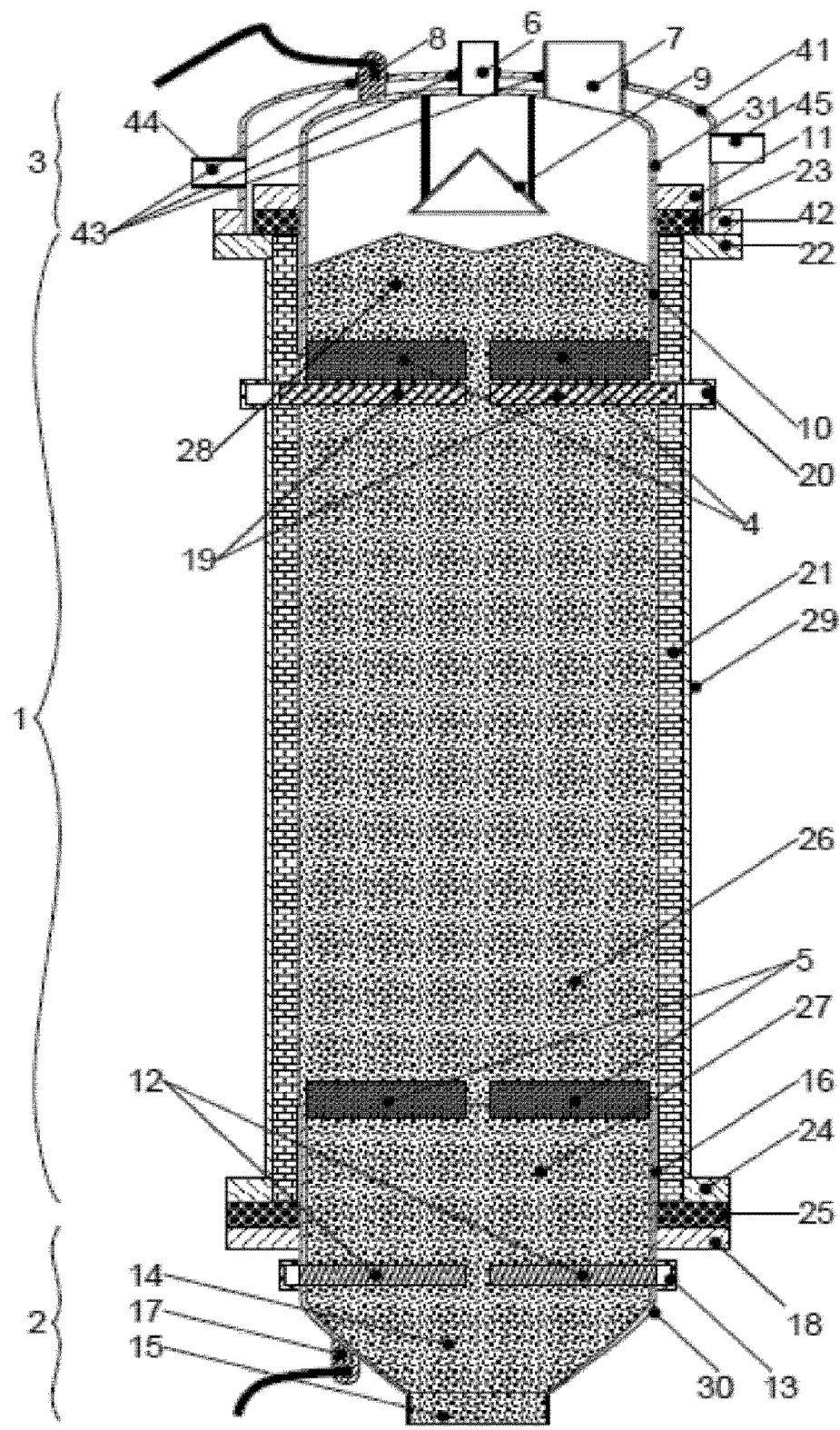
FIG. 6 shows one variant of the reactor of the invention with a twin-shell upper reactor hood.
Figure 7:
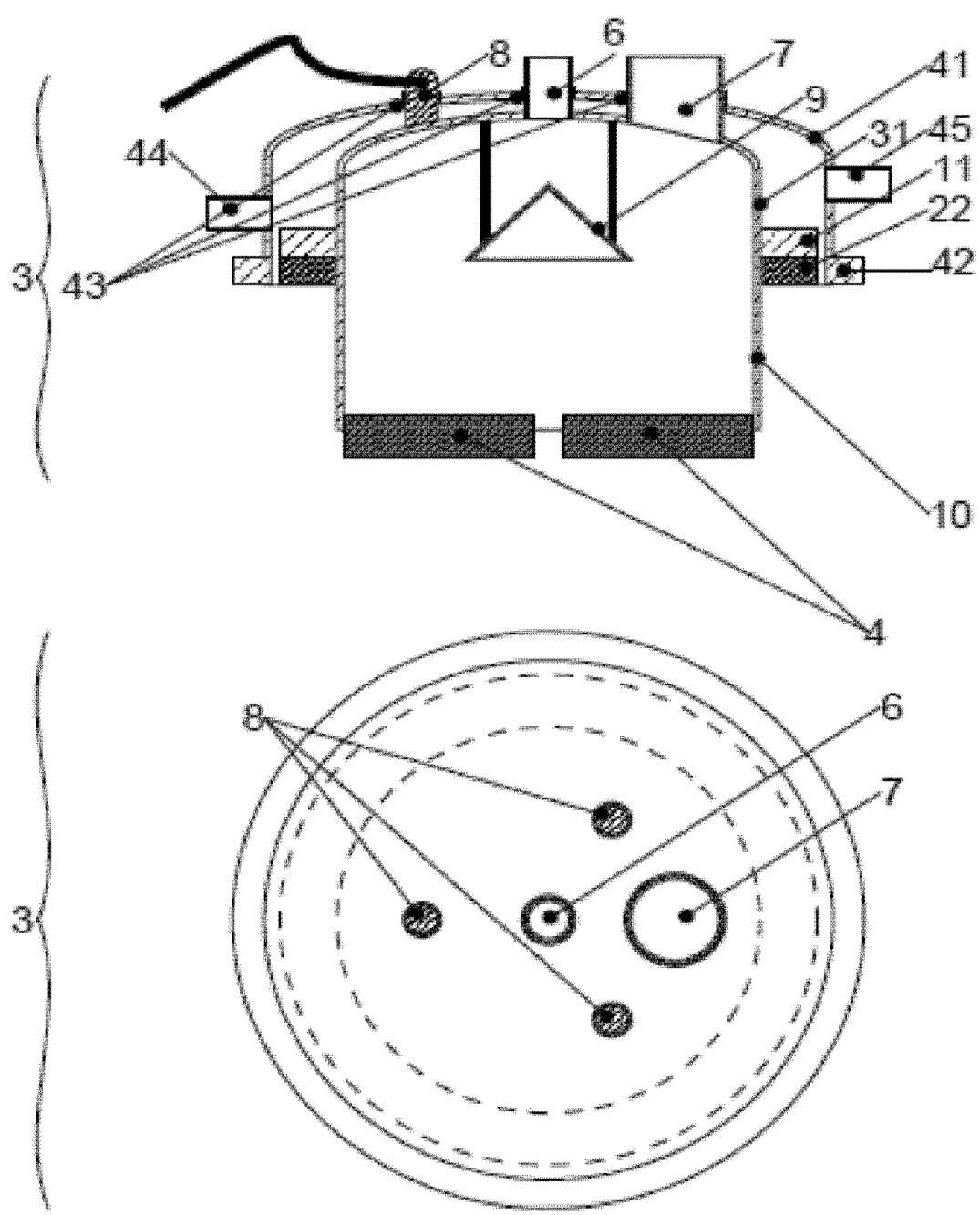
FIG. 7 shows a detail drawing of the upper reactor hood in side view (top) and in top view (bottom).
Figure 8:
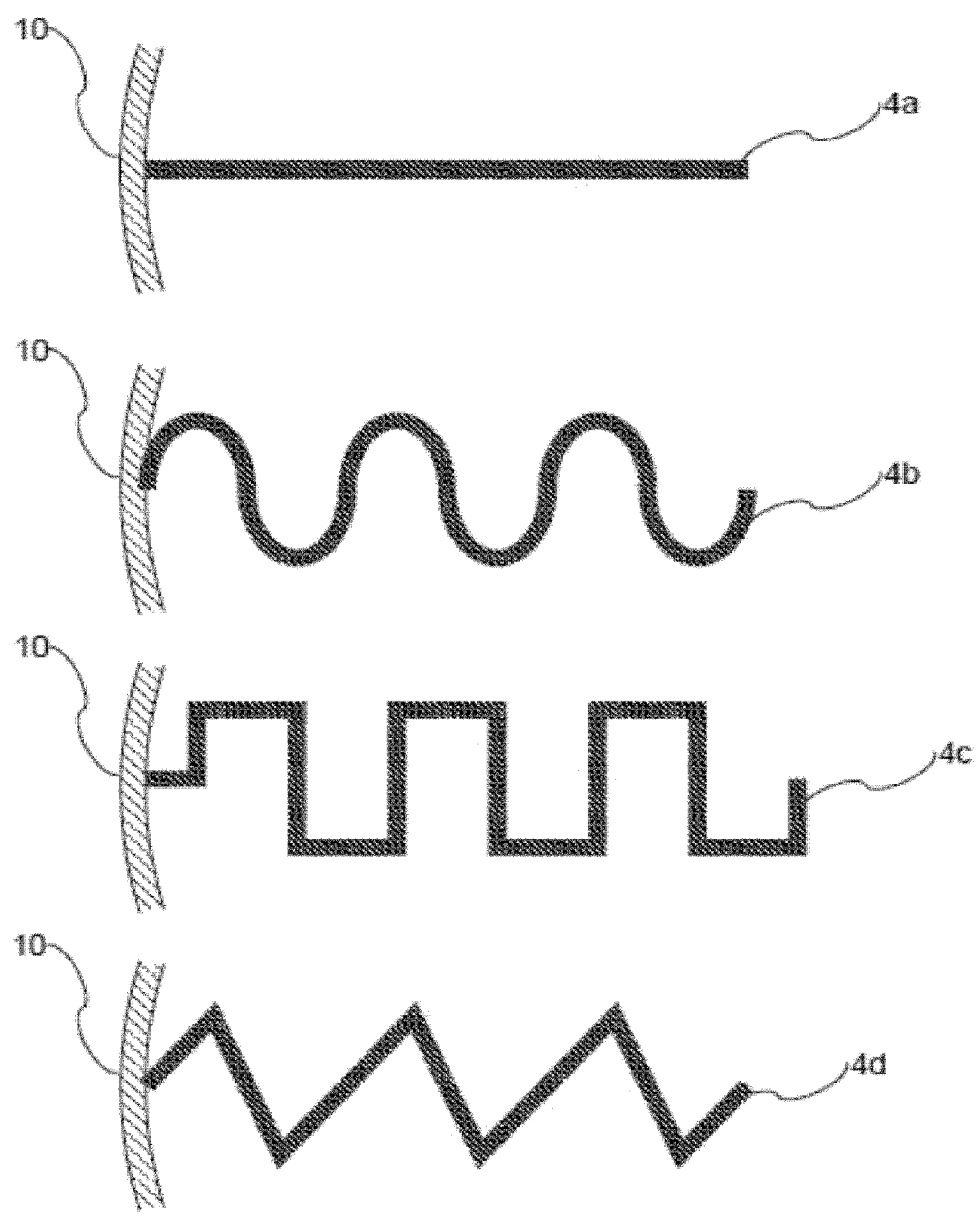
FIG. 8 shows advantageous longitudinal profiles of the electrode bars in the upper electrode of the invention. Identical profiles in each case are used in the lower electrode.
Figure 9:
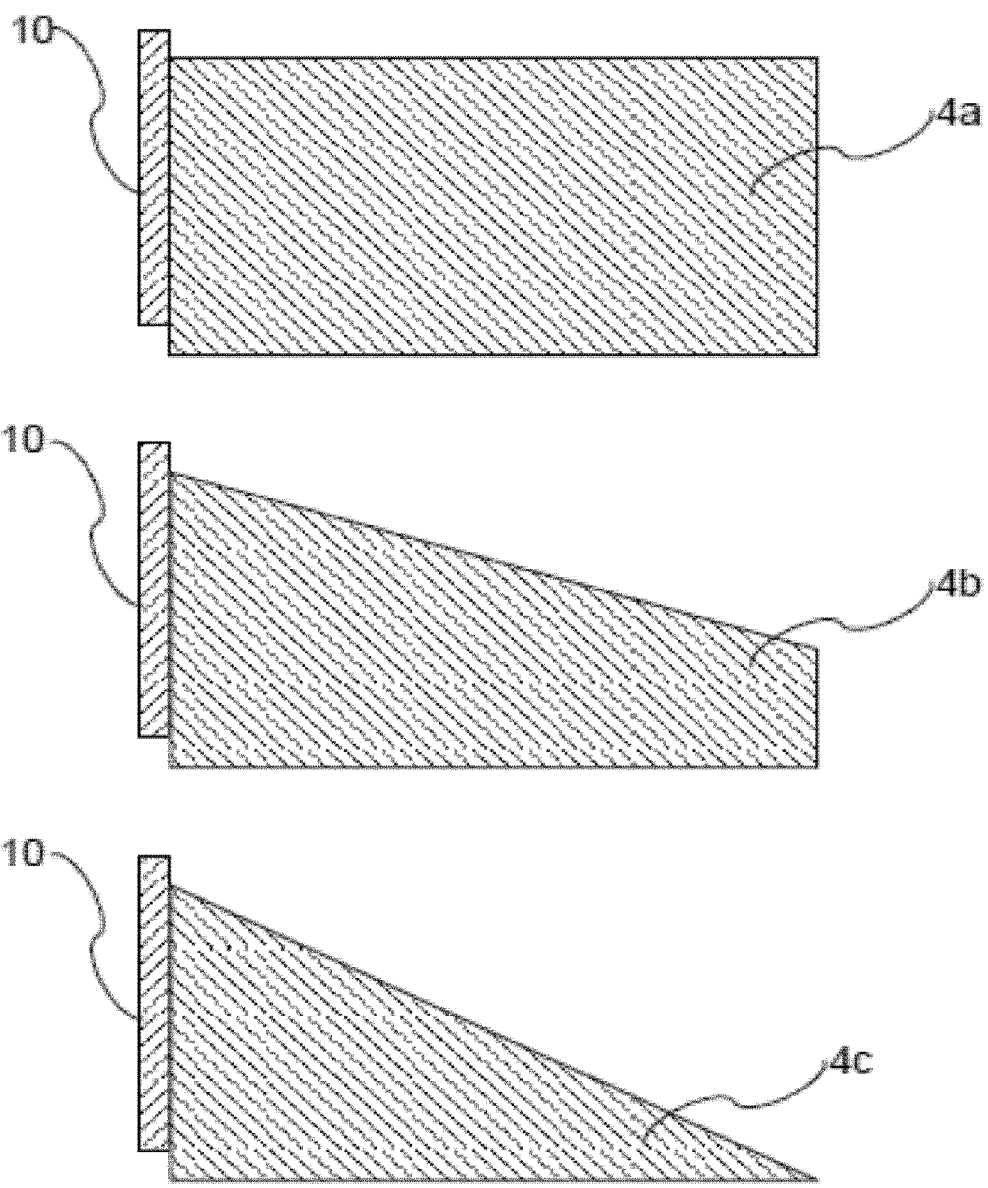
FIG. 9 shows advantageous side profiles of the electrode bars in the upper electrode of the invention. The bottom side of the bars is horizontal.
Figure 10:
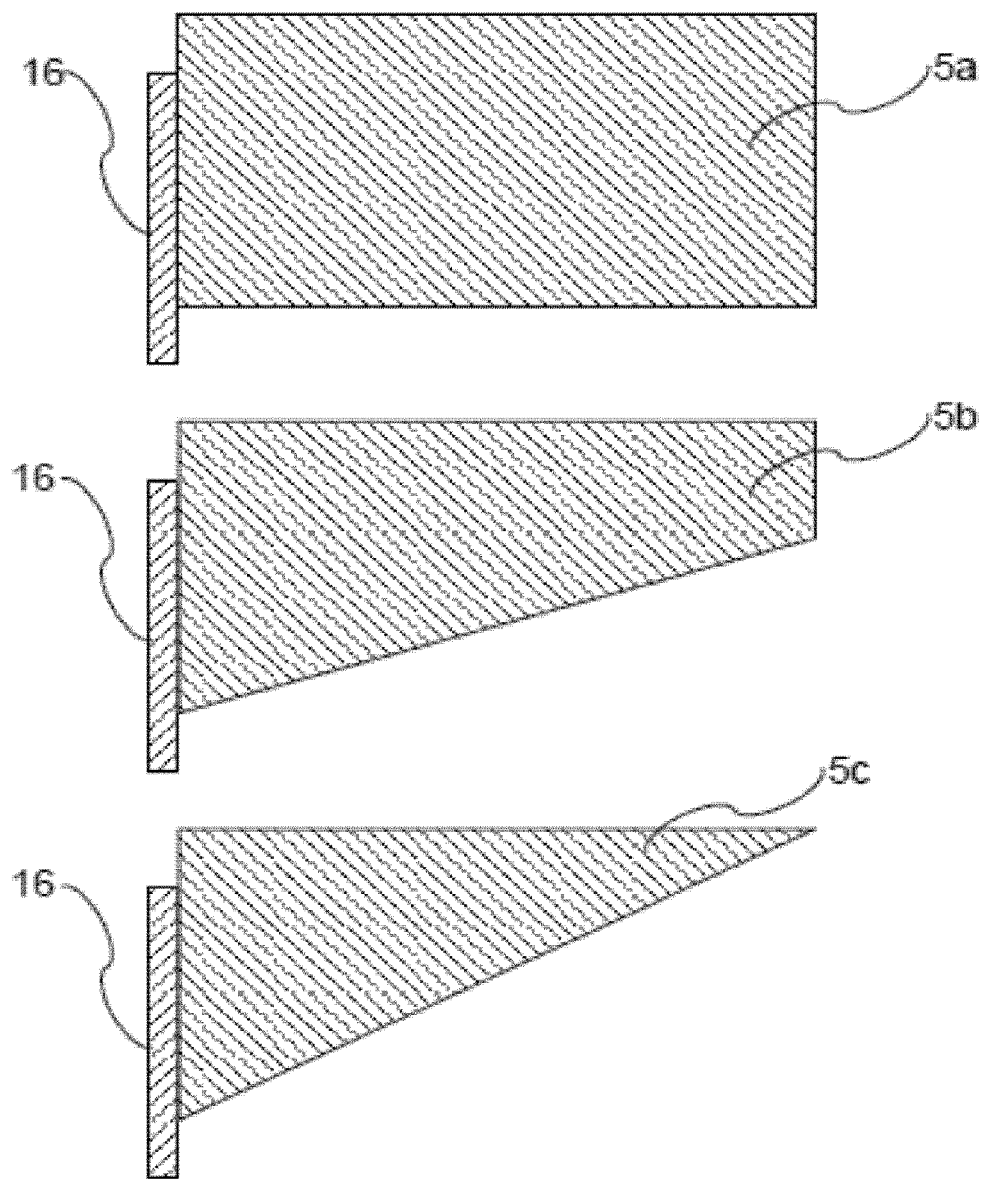
FIG. 10 shows advantageous side profiles of the bars in the lower electrode of the invention. The top side of the bars is horizontal.
Figure 11:
FIG. 11 shows advantageous cross-sectional profiles of the electrode bars and plates of an electrode of the invention in grid form.
Figure 11:
Figure 11:

The side profile of the electrode bars is rectangular with length 1600 mm and height 300 mm. The cross section of the electrode bars is hexagonal, as shown in FIG. 11. The electrode bars are designed as hollow profiles. The shell of the electrode bars consists of a multilayer mesh weave (HAVER & BOECKER POROSTAR STANDARD 6-ply).

Along the electrode bars, the electrode plates are mounted at equal distances of 200 mm. The electrode plates consist of molybdenum. The electrode plates are secured to the electrode bars straight and to the middle according to FIG. 13b. The length of electrode plates increases from the inside outward. Specifically, the length of electrode plates is (175 mm, 260 mm, 350 mm, 440 mm, 525 mm, 610 mm, 700 mm, 790 mm). The side profile of the electrode plates is rectangular. The height of the electrode plates is a uniform 200 mm. The electrodes are designed as solid profiles. The cross section of the electrode plates is hexagonal as shown in FIG. 11; the thickness of the electrode plates is a uniform 20 mm.

The electrical current is introduced via the reactor hoods. The upper hood has the shape of a dished end and consists of 1.4541 steel having a wall thickness of 20 mm. Screwed onto the hood is a cylindrical skirt of molybdenum having a length of 1000 mm. The lower hood has a conical shape and consists of 1.4541 steel having a wall thickness of 20 mm. Screwed onto the hood is a cylindrical skirt of molybdenum having a length of 1000 mm. An electrical current of 67 500 A is to be introduced into the reactor. Contact connection via the hood and twelve electrode bars: the heat loss is 19.5 kW, corresponding to 0.2% of the power transferred. This power results in heating of the hoods by about 100 K above the ambient temperature and can be removed to the environment without any special measures.

The electrode bars function simultaneously as channels for the side draw removal of a substream from the reaction zone. For this purpose, the electrode bars are pushed through the skirt and are open at the outer end. All electrode bars end in a ring channel that functions as collecting channel for the side draw removal. As a result, 15% of the gas stream is drawn off at the upper end of the heated zone of the reaction zone. With these settings, a methane conversion of 96.5% is achieved. The maximum temperature in the reactor is 1320° C. The temperature differential between the solid product stream and the gaseous reactant stream at the lower end of the reactor is 26 K and the temperature differential between the gaseous product stream and the solid reactant stream at the upper end of the reactor is 75 K. As a result, excellent thermal integration is achieved in the reactor. The excess heat is discharged mainly with the sidestream at a temperature level of 1270° C.

SUMMARY

|  | Comparative example | Inventive example |
| --- | --- | --- |
| Power loss in the electrodes | 1 MW | 0.02 MW |
| Proportion of power dissipated in the electrodes based on the effective process power | 12.5% | 0.2% |
| Methane conversion | 94.2% | 96.5% |
| Max. temperature in the reactor | 1230° C. | 1320° C. |
| Efficiency of the thermal integration in the main stream | 60% | 72% |
| Efficiency of the thermal integration in the main stream and in the sidestream | 60% | 83% |

The invention claimed is:

1. An electrically heatable packed pressure-bearing apparatus having an upper apparatus section, a middle apparatus section and a lower apparatus section, where at least one pair of electrodes in a vertical arrangement is installed in the middle apparatus section and all electrodes are disposed in an electrically conductive solid-state packing, the upper and lower apparatus sections each have a specific conductivity of $10^5$ S/m to $10^8$ S/m, and the middle apparatus section is electrically insulated against the electrically conductive solid-state packing, wherein the upper and lower apparatus sections are electrically insulated from the middle apparatus section, an upper electrode is connected via the upper apparatus section and a lower electrode via the lower apparatus section or each electrode is connected via one or more connecting elements that are in electrical contact with these sections and a ratio of a cross-sectional area of each of the upper and lower electrodes to a cross-sectional area of the respective connecting element or, without use of a connecting element, a ratio of the cross-sectional area of each of the upper and lower electrodes to a cross-sectional area of the respective apparatus section is 0.1 to 10.

2. The apparatus of claim 1, wherein the ratio of the cross-sectional area of each of the upper and lower electrodes to the cross-sectional area of the respective connecting element or, without use of a connecting element, the ratio of the cross-sectional area of each of the upper and lower electrodes to the cross-sectional area of the respective apparatus section is 0.3 to 3.

3. The apparatus of claim 1, wherein a ratio of the cross-sectional area of the one or more connecting elements to a cross-sectional area of the solid-state packing is 0.001 to 0.2 and/or a ratio of the cross-sectional area of the upper or lower apparatus section to the cross-sectional area of the solid-state packing is 0.001 to 0.2.

4. The apparatus of claim 1, wherein the electrodes are configured as an electrode grid in the form of spokes with 2 to 30 bars arranged in a star shape.

5. The apparatus of claim 1, wherein electrode bars are connected at their outer ends to at least one connecting element or via the upper or lower apparatus section and this connection is the sole fixed support for the positioning of each bar the individual electrode bars.

6. The apparatus of claim 1, wherein a temperature of the upper electrode is at least 350° C.

7. The apparatus of claim 1, wherein each of the upper and lower apparatus sections is configured as a hood and is removable from the middle apparatus section.

8. The apparatus of claim 1, wherein a current-conducting contact surface between each electrode and the respective connecting element is between 0.1 cm² and 10 000 cm².

9. The apparatus of claim 1, wherein a vertical distance between an upper edge of the electrically conductive solid-state packing and a lower edge of the electrodes at the upper electrode is from 10 mm to 5000 mm and a vertical distance between an upper edge of the electrodes at the lower electrode and a feed of gaseous reactants is from 10 mm to 5000 mm.

10. The apparatus of claim 1, wherein a cross-sectional blocking of the electrodes is between 1% and 20%.

11. The apparatus of claim 1, wherein electrode bars each have 1 to 100 electrode plates secured thereto and divide a cross section of the apparatus into grid cells, where an equivalent diameter of the grid cells is between 10 mm and 2000 mm.

12. The apparatus of claim 1, wherein the upper and/or lower apparatus section is in a twin-shell design and an inner shell is a current-conducting connecting element and an outer shell is electrically insulated from the inner shell.

13. A process for conducting an endothermic gas phase or gas-solid reaction, the process comprising operating the apparatus of claim 1.

14. The process of claim 13, wherein the electrically conductive solid-state packing is executed as a countercurrent moving bed.

15. The process of claim 13, wherein, at an upper edge of the electrically conductive solid-state packing, a difference between an exit temperature of a gaseous product stream and a feed stream of solid particles is from 0 K to 500 K and,
  at a lower edge of the electrically conductive solid-state packing, a difference between an exit temperature of a solid product stream and a gaseous feed stream is from 0 K to 500 K.

16. The process of claim 13, wherein a temperature of the upper electrode is at least 350° C.

* * * * *